United States Patent
Keivan et al.

(10) Patent No.: US 11,086,328 B2
(45) Date of Patent: Aug. 10, 2021

(54) AUTONOMOUS CART FOR MANUFACTURING AND WAREHOUSE APPLICATIONS

(71) Applicant: A9.com, Inc., Palo Alto, CA (US)

(72) Inventors: Nima Keivan, Boulder, CO (US); Juan Falquez, Boulder, CO (US); Andrew E. Hoffman, Morrison, CO (US); Jonathan McQueen, Boulder, CO (US)

(73) Assignee: A9.COM, INC., Palo Alto, CA (US)

( * ) Notice: Subject to any disclaimer, the term of this patent is extended or adjusted under 35 U.S.C. 154(b) by 10 days.

(21) Appl. No.: 16/277,291

(22) Filed: Feb. 15, 2019

(65) Prior Publication Data

US 2019/0179329 A1 Jun. 13, 2019

Related U.S. Application Data

(63) Continuation of application No. PCT/US2017/048201, filed on Aug. 23, 2017.
(Continued)

(51) Int. Cl.
*G05D 1/02* (2020.01)

(52) U.S. Cl.
CPC ......... *G05D 1/0221* (2013.01); *G05D 1/0214* (2013.01); *G05D 1/0217* (2013.01);
(Continued)

(58) Field of Classification Search
CPC .. G05D 1/0221; G05D 1/0214; G05D 1/0217; G05D 1/0238; G05D 1/0246;
(Continued)

(56) References Cited

U.S. PATENT DOCUMENTS 5,944,132 A * 8/1999 Davies .................. A63B 57/00
180/168
6,046,565 A 4/2000 Thorne
(Continued)

FOREIGN PATENT DOCUMENTS

EP 2940426 A1 11/2015
WO 2007047510 A2 4/2007
(Continued)

OTHER PUBLICATIONS

Fetch Robotics, "Cart Connect," 2018.
(Continued)

*Primary Examiner* — Peter D Nolan
*Assistant Examiner* — Ashley L Redhead, Jr.
(74) *Attorney, Agent, or Firm* — Eversheds Sutherland (US) LLP

(57) ABSTRACT

An autonomous cart moves products and materials in an industrial environment. It is different from conventional carts because it can navigate autonomously indoors or outdoors in dynamic environments where things change frequently. This autonomous cart uses state-of-the-art "dense" visual perception giving it unequalled and continuous awareness of its surroundings. With this it can operate at a cost, speed, level of safety and efficiency that has never been possible before. This robotic cart makes factories and warehouses more efficient and safer. It enables the movement of smaller batches of material more frequently, reduces the need for expensive conveyor systems, and helps eliminate dangerous and polluting fork trucks from indoor environments.

19 Claims, 17 Drawing Sheets

Related U.S. Application Data

(60) Provisional application No. 62/378,467, filed on Aug. 23, 2016.

(52) U.S. Cl.
CPC ......... *G05D 1/0238* (2013.01); *G05D 1/0246* (2013.01); *G05D 1/0274* (2013.01); *G05D 1/0289* (2013.01); *G05D 2201/0207* (2013.01); *G05D 2201/0216* (2013.01)

(58) Field of Classification Search
CPC ............... G05D 1/0274; G05D 1/0289; G05D 2201/0207; G05D 2201/0216
See application file for complete search history.

(56) References Cited

U.S. PATENT DOCUMENTS

| | | |
|---|---|---|
| 6,917,893 B2 | 7/2005 | Dietsch et al. |
| 7,100,725 B2 | 9/2006 | Thorne |
| 7,431,115 B2 | 10/2008 | Thorne |
| 7,650,013 B2 | 1/2010 | Dietsch et al. |
| 7,693,654 B1 | 4/2010 | Dietsch et al. |
| 7,894,939 B2 | 2/2011 | Zini et al. |
| 7,912,633 B1 | 3/2011 | Dietsch et al. |
| 7,996,109 B2 | 8/2011 | Zini et al. |
| 8,010,230 B2 | 8/2011 | Zini et al. |
| 8,041,455 B2 | 10/2011 | Thorne |
| 8,200,423 B2 | 6/2012 | Dietsch et al. |
| 8,204,624 B2 | 6/2012 | Zini et al. |
| 8,548,646 B1 | 10/2013 | Gariepy et al. |
| 8,688,275 B1 | 4/2014 | LaFary et al. |
| 8,803,737 B2 | 8/2014 | Bush et al. |
| D717,208 S | 11/2014 | Stone et al. |
| 8,886,390 B2 | 11/2014 | Wolfe et al. |
| D722,281 S | 2/2015 | Stone et al. |
| D722,631 S | 2/2015 | Stone et al. |
| D722,632 S | 2/2015 | Stone et al. |
| 8,948,914 B2 | 2/2015 | Zini et al. |
| 9,020,679 B2 | 4/2015 | Zini et al. |
| 9,026,301 B2 | 5/2015 | Zini et al. |
| 9,069,794 B1 | 6/2015 | Bandukwala et al. |
| D736,117 S | 8/2015 | Stone et al. |
| 9,223,313 B2 | 12/2015 | Wolfe et al. |
| 9,245,305 B2 | 1/2016 | Wellington et al. |
| 9,559,461 B1 | 1/2017 | Diehr |
| 9,563,206 B2 | 2/2017 | Zini et al. |
| 9,592,609 B2 | 3/2017 | LaFary et al. |
| 9,592,969 B2 | 3/2017 | Wolfe et al. |
| 9,606,544 B2 | 3/2017 | Gariepy et al. |
| 9,618,931 B2 | 4/2017 | Zini et al. |
| 9,619,617 B2 | 4/2017 | Skirble et al. |
| 9,637,318 B2 | 5/2017 | Messina |
| 9,663,025 B2 | 5/2017 | Drexler et al. |
| 9,679,270 B2 | 6/2017 | Zini et al. |
| 9,744,667 B1 | 8/2017 | Ferguson |
| 9,804,594 B2 | 10/2017 | Gariepy et al. |
| 9,827,668 B2 | 11/2017 | King et al. |
| 9,827,669 B2 | 11/2017 | Ferguson et al. |
| 9,891,630 B2 | 2/2018 | Gariepy et al. |
| D812,663 S | 3/2018 | Waters et al. |
| 9,927,814 B2 | 3/2018 | Wise et al. |
| 9,943,963 B2 | 4/2018 | Wise |
| 9,956,688 B2 | 5/2018 | Ferguson et al. |
| 9,963,155 B2 | 5/2018 | Gariepy et al. |
| 9,964,955 B2 | 5/2018 | Keivan et al. |
| 10,011,434 B1 | 7/2018 | Messina |
| 2003/0040979 A1 | 2/2003 | Borroni-Bird et al. |
| 2003/0176986 A1 | 9/2003 | Dietsch et al. |
| 2005/0029029 A1 | 2/2005 | Thorne |
| 2005/0114774 A1 | 5/2005 | Berryman |
| 2006/0120601 A1 | 6/2006 | Dietsch et al. |
| 2007/0051546 A1 | 3/2007 | Thorne |
| 2007/0112461 A1 | 5/2007 | Zini et al. |
| 2007/0129849 A1 | 6/2007 | Zini et al. |
| 2008/0009965 A1 | 1/2008 | Bruemmer et al. |
| 2008/0040681 A1 | 2/2008 | Synstelien et al. |
| 2008/0047375 A1* | 2/2008 | Sonoura ............... G05D 1/0891 74/5.22 |
| 2009/0024482 A1 | 1/2009 | Synstelien et al. |
| 2009/0030569 A1 | 1/2009 | Thorne |
| 2009/0144630 A1 | 6/2009 | Berryman et al. |
| 2009/0144631 A1 | 6/2009 | Berryman et al. |
| 2010/0234990 A1 | 9/2010 | Zini et al. |
| 2010/0234991 A1 | 9/2010 | Zini et al. |
| 2010/0234995 A1 | 9/2010 | Zini et al. |
| 2011/0037565 A1 | 2/2011 | Skirble et al. |
| 2011/0137457 A1 | 6/2011 | Zini et al. |
| 2011/0137759 A1 | 6/2011 | Wellington et al. |
| 2011/0163160 A1 | 7/2011 | Zini et al. |
| 2011/0208745 A1 | 8/2011 | Dietsch et al. |
| 2011/0224845 A1 | 9/2011 | Perry et al. |
| 2011/0288695 A1 | 11/2011 | Gariepy et al. |
| 2011/0313604 A1* | 12/2011 | Kume .................. B62B 5/0073 701/22 |
| 2013/0084775 A1 | 4/2013 | Mimlitch et al. |
| 2013/0085625 A1 | 4/2013 | Wolfe et al. |
| 2013/0245857 A1 | 9/2013 | Gariepy et al. |
| 2014/0074287 A1 | 3/2014 | LaFary et al. |
| 2014/0330428 A1 | 11/2014 | Wolfe et al. |
| 2014/0350725 A1 | 11/2014 | LaFary et al. |
| 2014/0365258 A1 | 12/2014 | Vestal et al. |
| 2015/0039157 A1 | 2/2015 | Wolfe et al. |
| 2015/0045945 A1 | 2/2015 | Zini et al. |
| 2015/0227885 A1 | 8/2015 | Zini et al. |
| 2015/0234386 A1 | 8/2015 | Zini et al. |
| 2015/0323699 A1 | 11/2015 | Gariepy et al. |
| 2016/0031086 A1 | 2/2016 | Tanabe et al. |
| 2016/0110684 A1 | 4/2016 | Wellington et al. |
| 2016/0124434 A1 | 5/2016 | Gariepy et al. |
| 2016/0129917 A1 | 5/2016 | Gariepy et al. |
| 2016/0282126 A1* | 9/2016 | Watts ............... H03K 19/17768 |
| 2016/0349749 A1 | 12/2016 | Gariepy et al. |
| 2016/0349754 A1 | 12/2016 | Mohr et al. |
| 2016/0364686 A1 | 12/2016 | Wolfe et al. |
| 2017/0038776 A1 | 2/2017 | Gariepy et al. |
| 2017/0072558 A1 | 3/2017 | Reynolds et al. |
| 2017/0080846 A1 | 3/2017 | Lord et al. |
| 2017/0080850 A1 | 3/2017 | Drexler et al. |
| 2017/0120454 A1 | 5/2017 | Ferguson et al. |
| 2017/0158431 A1* | 6/2017 | Hamilton ......... G05B 19/41895 |
| 2017/0183169 A1 | 6/2017 | Wolfe et al. |
| 2017/0197643 A1 | 7/2017 | Gariepy et al. |
| 2017/0205833 A1 | 7/2017 | Gariepy et al. |
| 2017/0232885 A1 | 8/2017 | Drexler et al. |
| 2017/0233231 A1 | 8/2017 | Gariepy et al. |
| 2017/0252926 A1 | 9/2017 | Wise et al. |
| 2017/0253136 A1 | 9/2017 | Lord et al. |
| 2017/0276501 A1 | 9/2017 | Wise et al. |
| 2017/0291303 A1 | 10/2017 | Ferguson et al. |
| 2017/0291315 A1 | 10/2017 | Wise |
| 2017/0294784 A1 | 10/2017 | King et al. |
| 2017/0297197 A1 | 10/2017 | King et al. |
| 2017/0305011 A1 | 10/2017 | Ferguson et al. |
| 2018/0004200 A1 | 1/2018 | Gariepy et al. |
| 2018/0039276 A1 | 2/2018 | Keivan et al. |
| 2018/0081373 A1 | 3/2018 | Gariepy et al. |
| 2018/0169857 A1 | 6/2018 | Henning et al. |
| 2018/0169866 A1 | 6/2018 | Wise |

FOREIGN PATENT DOCUMENTS

| | | |
|---|---|---|
| WO | 2007047514 A2 | 4/2007 |
| WO | 2015017231 A1 | 2/2015 |
| WO | 2015069560 A1 | 5/2015 |
| WO | 2018039337 A1 | 3/2018 |

OTHER PUBLICATIONS

Fetch Robotics, "Fetch Robotics Announces CartConnect and RollerTop Robots," Apr. 5, 2018.
Fetch Robotics, "RollerTop," 2018.

(56) References Cited

OTHER PUBLICATIONS

Gálvez-López et al.,"Bags of binary words for fast place recognition in image sequences." IEEE Transactions on Robotics 28.5 (2012): 1188-1197.
International Search Report and Written Opinion in International Patent Application No. PCT/US2017/048201 dated Dec. 7, 2017, 9 pages.
Reynolds "Adept Technology's Autonomous Mobile Robotic Conveyor," May 1, 2013.

* cited by examiner

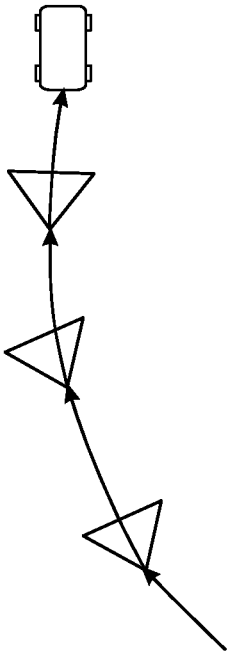
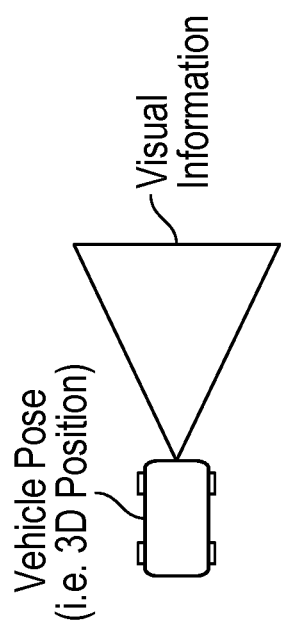
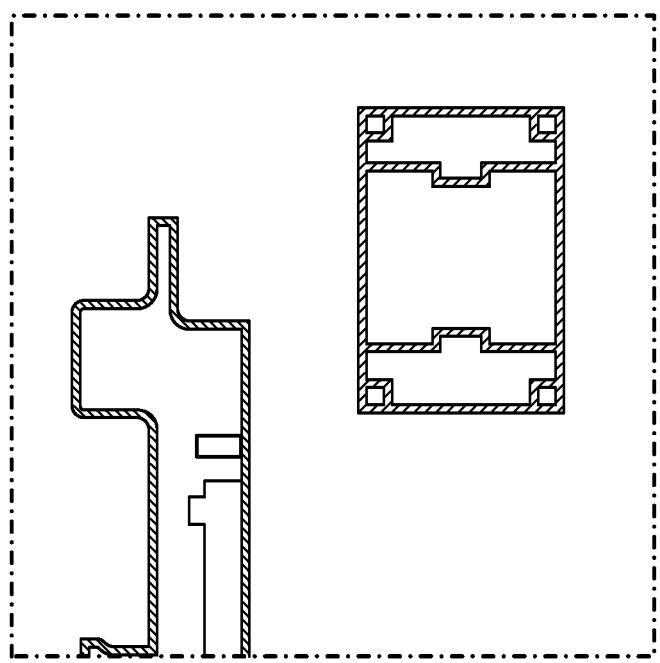
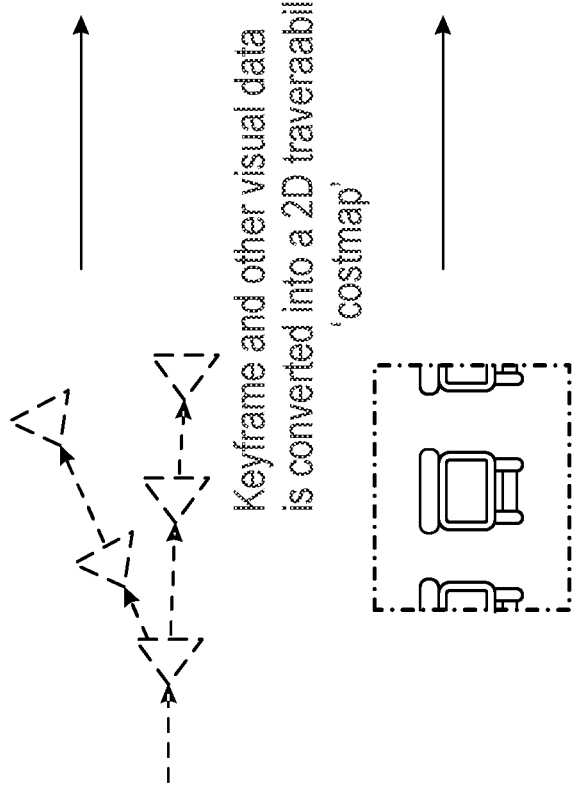
FIG. 11
FIG. 12
FIG. 13
Keyframe and other visual data is converted into a 2D traveraability 'costmap'

As Cart A moves it Create Keyframes.

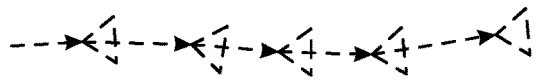

Cart A's Keyframes are Seek to the Map Server.

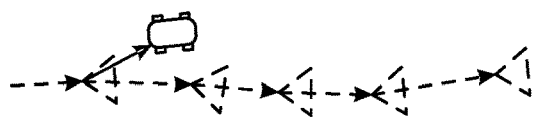

Cart A's Keyframes are Sent to Cart B. Cart B uses Cart A's Keyframe Data to Recognize its Position[Pose] Relative as Cart A's Previous Keyframes.

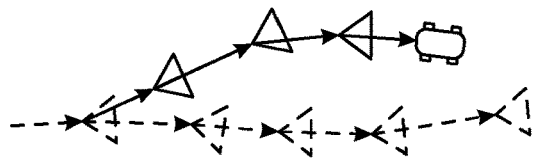

Cart B Generates its Own Keyframe Data.

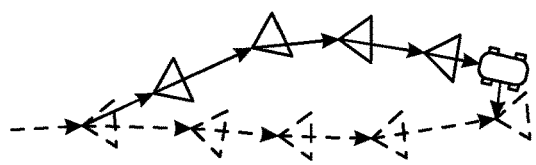

Cart B Continously Recognizes Relationships between its Contact Positions and Cart A's Keyframe History.

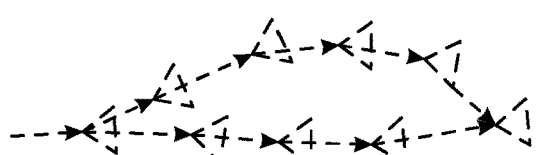

Cart B Sends its Keyframes and Noted Realationships between its Keyframes and Cart A's Keyframes to the Server. The Server Selectively Xxxxx of Combines this Data Together, Generating as Slightly altered, Unused Keyframe Graph.

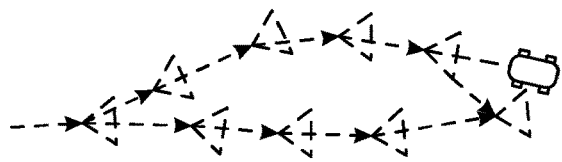

The "Fusing" Decisions Made by the Server has Progressions back to Carts A and B. They Adjust the Alter Positions[Pose] Estimates Accordingly.

The Position Repeats...

FIG. 14

AUTONOMOUS CART FOR MANUFACTURING AND WAREHOUSE APPLICATIONS

CROSS-REFERENCE TO RELATED APPLICATION(s)

This application is a bypass continuation application of International Application No. PCT/US2017/048201, filed on Aug. 23, 2017, and "Autonomous Cart for Manufacturing and Warehouse Applications," which in turn claims the priority benefit, under 35 U.S.C. § 119(e), of U.S. Application No. 62/378,467, filed on Aug. 23, 2016, and entitled "Autonomous Cart for Manufacturing and Warehouse Applications." Each of these applications is incorporated herein by reference in its entirety.

BACKGROUND

An automated guided vehicle or automatic guided vehicle (AGV) is a mobile robot used in industrial applications to move materials around manufacturing facilities and warehouses. An AGV typically follows markers or wires in the floor or uses vision, magnets, or lasers for navigation. Many conventional AGVs use light detection and ranging (LIDAR) to position themselves relative to surrounding objects. This is an improvement over magnetic wires, but still has limitations. In particular, LIDAR uses a narrow beam of electromagnetic radiation (light) and therefore only 'sees' objects if a return is detected and if the objects are illuminated directly by the narrow beam of electromagnetic radiation. Two-dimensional (2D) LIDAR sensors spin this narrow beam around a vertical axis and therefore detect objects only in a single horizontal plane. For example, to a single sweep LIDAR common in today's AGVs, a table or desk may look like two independent legs if the LIDAR sweep is below the table or desk surface and the rear legs are occluded. (LIDAR-guided robots have been known to drive directly between table legs, hitting the table.)

Going a step further, three-dimensional (3D) LIDAR uses a number of these spinning beams spaced horizontally apart to sweep multiple lines each at a particular vertical angle. However, even 3D LIDAR is not truly an accurate representation, as it is limited by the number of horizontal lines. Other problems include LIDAR's inability to identify drops, such as stairs or loading docks. LIDAR can also be blinded by bright lights, mirrors, windowpanes, or other shiny objects. The net result is that LIDAR-guided AGVs only work well in places that are carefully controlled and mapped. This limitation makes conventional AGV unsuitable for many facilities and applications.

Directing a LIDAR-guided AGV to a particular place in a facility is also challenging. Typically, a user creates a map with named waypoints. (Many AGV systems undergo a mapping phase separate from the operation phase, requiring switching back to mapping when the environment is changed, etc.) The user tells the system that it needs a robot to come to a predefined waypoint. This requires extra work by the user, an updated map and waypoints. If a waypoint has not been defined for a particular location, there is no quick way to tell the system where the user is. Unfortunately, simply directing the AGV to a set of global positioning system (GPS) coordinates does not work because GPS generally does not work in indoor settings like factories and warehouses.

Conventional AGVs have other drawbacks as well. For instance, AGVs often stop in slightly inconvenient positions, and they are difficult to move. In fact, AGVs for use in industrial settings typically have drive systems which do not allow a person to move them manually. To move the robot even a few centimeters, the user or worker on the factory floor has to activate and control the powered drive system through some sort of control interface. The control interface may be a website, a laptop, an attached screen on the robot, or a joystick. In practice, the human user activates a 'manual drive' mode on the robot, then uses a joystick or a laptop to 'drive' the robot where they want it to go. Although this may be acceptable in some circumstances, it is a clumsy interaction which normally takes too long from the perspective of the human users who are often trying to move quickly.

Triggering other AGV movements also tends to be clumsy or take too much time. For instance, an AGV that has been loaded/unloaded by automatic or manual means typically requires some signal to trigger its release from the loading/unloading position once it is ready to depart. Typically this is done by a human operating a control panel (e.g., pushing a button), which adds cost and complexity to the physical design of the AGV. In other cases, the AGV may move after a certain amount of time or if it receives a command from another AGV or computer system.

SUMMARY

Embodiments of the present technology include autonomous carts, associated electronics, and methods of using autonomous carts that address the shortcomings of conventional AGVs. An autonomous cart (also referred to herein as an "autonomous robot" or "robot") uses a combination of cameras, complex algorithms, and a persistent map that adapts constantly to any changes in the environment. As a result, the cart can operate autonomously and automatically in nearly any physical environment, whether dark or light, indoors or outdoors, or in an unstable environment where physical objects move frequently. Changes to the physical area (such as pallets or boxes left on the floor, racks moved, or even walls moved) result in automatic real-time changes to the map used by the carts, without human interaction. The autonomous cart can automatically find its way around obstacles, even backtracking out of a blocked aisle.

If the obstacle is there day after day, a system including a server that is in communication with the autonomous cart makes it part of the 'permanent' map, and the carts plan their paths accordingly. The central server collates map updates from all of the carts and connects to the web to receive commands from end users or their warehouse management software. If the system discovers that something 'permanent' has moved, the system automatically adjusts the map and plans optimal routes.

An autonomous cart may include sensitive onboard load cells that it can use to estimate the actual mass that has been placed on or removed from its shelves. This enables the cart to be configured to depart a certain waypoint only after a set amount of mass has been placed on it, or a set amount has been removed from it. For example, if production cell A is supposed to make batches of 10 components at a time, the cart can be programmed to sit at cell A until the equivalent mass of 10 components have been placed on the cart. The cart then automatically departs cell A and delivers the components to production cell B. It would then sit still at B until all components have been removed or detected, at which point the cart automatically returns to cell A.

The benefit of this mass-triggered automatic departure is more than simply eliminating a step required by the user. Because the system can be configured to return to A only after B has completed its operations with all components, the automatic signal generated when the cart at B is fully loaded or unloaded can be used as an automatic 'signal' to A to produce again. This is a fundamental desire of 'lean' manufacturing and therefore a powerful tool for manufacturers.

The load cells can also be used together with a unique drive system, including sensitive accelerometers, to enable or actuate movement of the cart. Consider the case in which a human user wants to push or nudge a stopped cart in a particular direction. Using load cells, the cart senses the forces from the human and actively turns all wheels in the direction desired. The drive system (or brake) is then disengaged to allow the user to 'push' the cart as they would push any normal unpowered nonrobotic pushcart or trolley. Very little training is required, as the user does not need to be trained to use a joystick or other software. (Without the cart, the operator would typically use a pushcart, which can be moved almost effortlessly with a push of the hands. This manual movement of pushcarts is done surprisingly frequently, to position the cart in a more convenient position or orientation.)

The load cell and accelerometers can also sense when a human has touched the cart. This enables haptic control of the cart. If a human taps a certain pattern on the cart (two taps within 1 second, for example) then the cart will depart that waypoint and continue on its route. Customers may choose which haptics/patterns they want to use, depending on their application and environment.

The cart also includes an onboard vision system to map indoor environments and trigger cart motion. For instance, the cart may include two stereo pairs of cameras—one pair at each end of the cart. The stereo pair cameras capture images of the surroundings. A processor on or communicatively coupled to the cart processes the captured images to identify the cart's location and the location, size, and/or orientation of the objects in the images relative to a stored map. For example, a processor on or communicatively coupled to the cart may recognize a gesture (a 'thumbs up,' for example) if the user puts their hand directly in front of the cameras (e.g., within a few feet of the front of the cart). Based on this gesture, the cart will depart that waypoint and continue on its route. The use of depth information obtained by stereo correlation allows the processor to disambiguate the gesture from one that is painted on a flat surface or on a T-shirt, for example.

The vision-based system may also be used to trigger a "come-to-me" response. If a user has a mobile device with a camera, all they have to do is use the camera to capture any image from their location and upload it to the system. The system can identify the user's precise location based on the image and direct the cart to that location.

Embodiments of the present technology include an autonomous cart comprising a chassis. The autonomous cart includes a plurality of wheels that are mechanically coupled to the chassis. The plurality of wheels enable movement of the chassis along a surface. A motor is mechanically coupled to at least one wheel in the plurality of wheels. The motor can rotate the at least one wheel and turn the at least one wheel to slow and/or stop the autonomous cart. A load cell is mechanically coupled to the chassis. The load cell can sense force exerted on the chassis and can generate a signal representing a magnitude and direction of the force. A processor is operably coupled to the load cell. The processor can actuate the motor in response to the signal generated by the load cell.

Embodiments of the present technology also include methods for enabling movement of an autonomous cart. The autonomous cart comprises a plurality of wheels. An example method includes detecting a force exerted against a side of the autonomous cart and in response to detecting the force, the example method includes, orienting the plurality of wheels in a direction of the force. In some instances, detecting the force comprises measuring the force with at least one load cell that is disposed in or on the autonomous cart.

Other embodiments of the present technology include autonomous methods and systems. For instance, an example method includes receiving a map of an environment from a server by a first autonomous cart. The first autonomous cart navigates through the environment based on the map. The first autonomous cart while navigating through the environment detects a change in the environment with respect to the map. The change in the environment can be at least one of an alteration in visual appearance of the environment with respect to the map or a discovery of a new portion of the environment not represented in the map. The first autonomous cart transmits a representation of the change to the server.

In some instances, the method further includes receiving an updated map of the environment from the server by the first autonomous cart. The updated map can show the change detected by the first autonomous cart. In some instances, receiving the map of the environment from the server can include retrieving a costmap of the environment by the first autonomous cart. The costmap can represent at least one of a passable area or an impassable area for the first autonomous cart in the environment. In some instances, navigating through the environment can also include generating a two-dimensional (2D) traversability map based on the costmap. The 2D traversability map including traversability information for the first autonomous cart.

The method can further include identifying a plurality of destinations for the first autonomous cart based on the 2D traysersability map. A set of maneuvers can be evaluated for the first autonomous cart to arrive at each of the plurality of destinations. A feasible path is calculated based on the evaluation of the set of maneuvers. A planned path is generated based at least in part on the feasible path. A smoothed trajectory for the first autonomous cart can be obtained based on the planned path.

The method can further include determining whether the smoothed trajectory violates a constraint in the traversability map. The smoothed trajectory and subsequent trajectories within the planned path can be rejected in response to determining that the smoothed trajectory violates the constraint. The smoothed trajectory and subsequent trajectories on the planned path can be executed in response to determining that the smoothed trajectory does not violate the constraint.

Other embodiments of the present technology include methods and systems such that an example method comprises transmitting a map of an environment by a first server to a first autonomous cart. The server receives a representation of a change in the environment that is detected by the first autonomous cart. The change can be indicative of at least one of an alteration in visual appearance of the environment with respect to the map and a discovery of a new portion of the environment not represented in the map. The server generates an updated map of the environment. The updated map can show a change detected by the first autonomous cart. The server transmits the updated map to at least one of the first autonomous cart or a second autonomous cart.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 11 illustrates how an autonomous robotic cart collects and uses keyframes, which represent a cart's pose and associated visual information captured with image sensors on the cart, to tie visual information to specific points in space.

FIG. 12 illustrates how keyframes can be connected via edges to from a map of a warehouse, manufacturing facility, or other environment.

FIG. 13 illustrates how three-dimensional (3D) information from multiple sources (including keyframes and other captured visual information) is converted into a two-dimensional (2D) traversability image, called a "costmap tile," that can be shared and used by different autonomous carts for planning purposes.

FIG. 14 illustrates how a pair of carts (carts A and B) share fused keyframe data through a common server (solid lines and figures represent information generated on the carts and dotted lines represent information shared with and provided by a map server).

DETAILED DESCRIPTION

An Autonomous Cart and its Components

Figure 1A:
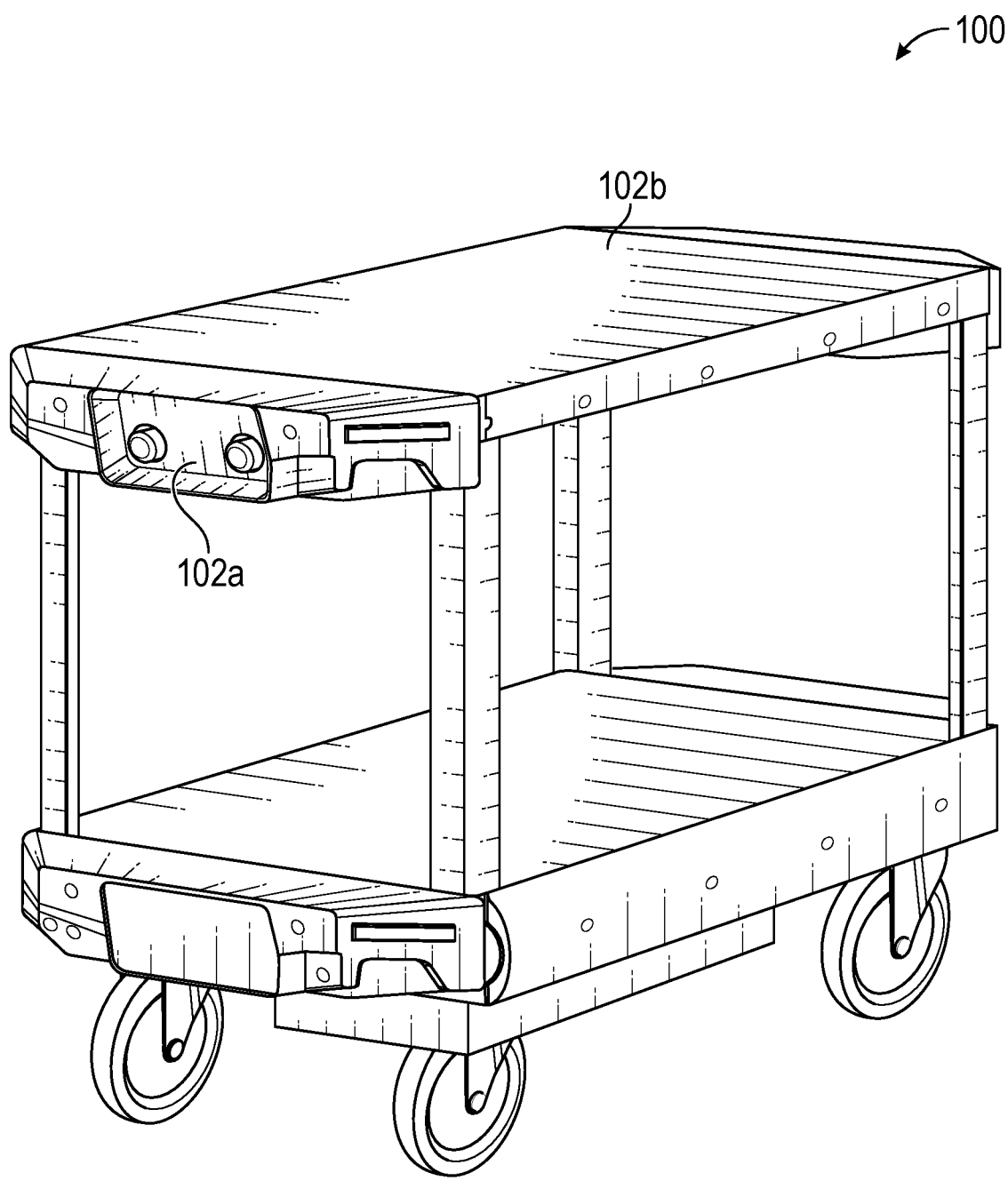
FIG. 1A shows an example autonomous cart.
Figure 1B:
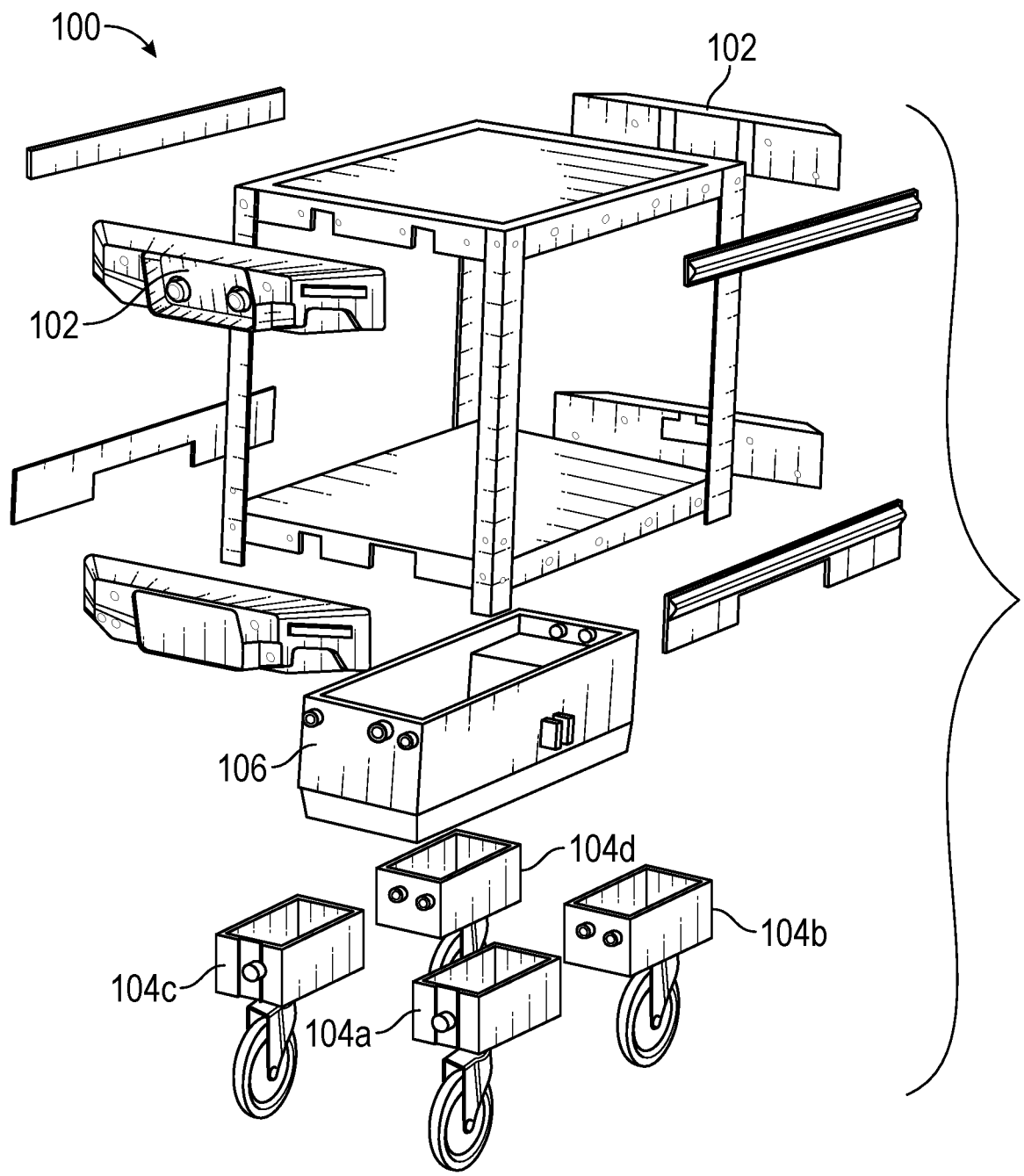
FIG. 1B is an exploded view of the autonomous cart of FIG. 1A.

FIGS. 1A and 1B show perspective and exploded views, respectively, of an example autonomous cart 100 suitable for use in warehouses, manufacturing facilities, and outdoor settings. The autonomous cart includes forward-looking 102a and backward looking 102b binocular vision sensor units (collectively, binocular vision sensor units 102), each of which includes two laterally displaced image sensors and accompanying hardware; four drive train units (for example, 104a, 104b, 104c, and 104d, collectively, drive train units 104), each of which is mounted under a different corner of the chassis; and an underbelly 106 containing additional electronics. The autonomous cart 100 can also include a two-dimensional LIDAR sensor (not shown) to look sideways and identify objects or people approaching the cart from the side that the binocular vision sensor units may not sense or identify. The autonomous cart may also include other sensors and electronics, including side-looking image or acoustic sensors as well as an antenna for communicating with a wireless communication network using a suitable wireless communication protocol (e.g., IEEE 802.11 protocols).

Figure 1C:
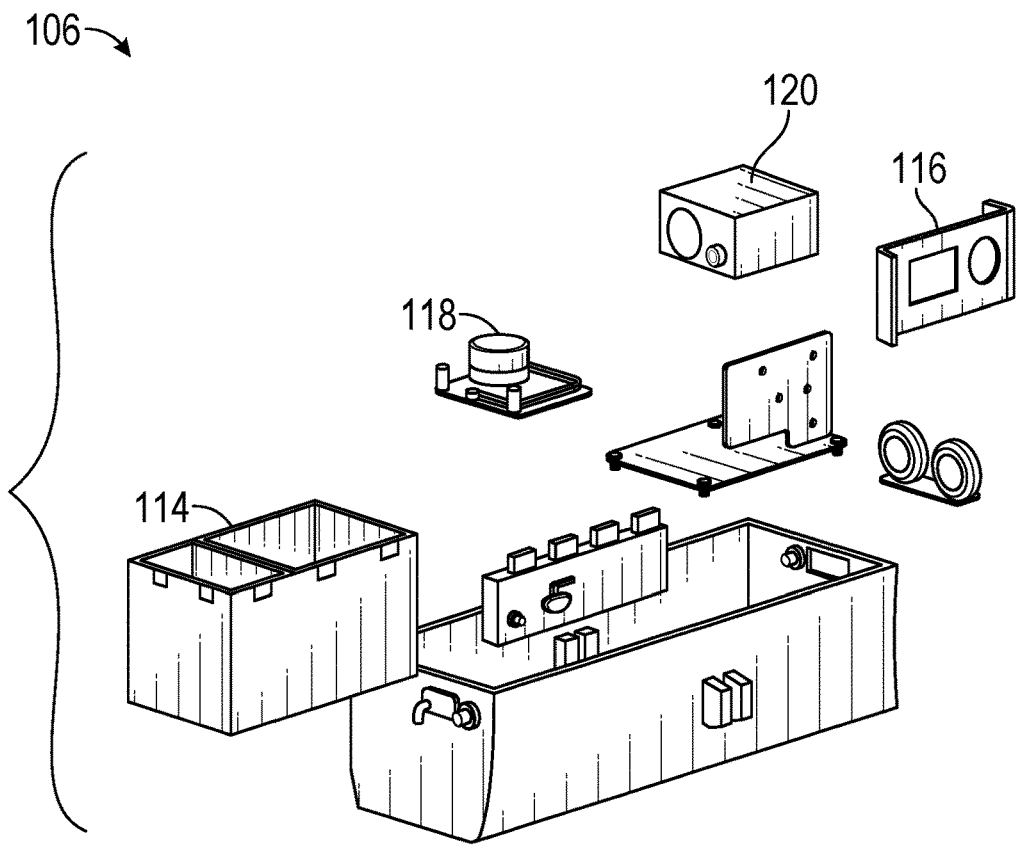
FIG. 1C is an exploded view of an underbelly unit for the autonomous cart of FIG. 1A.

FIG. 1C shows an exploded view of the underbelly 106, which includes several processors and a battery 114 for powering the electronics on the autonomous cart. The processors include a graphics processor unit (GPU) 116 and central processor unit (CPU) 118 for processing information from the cart's sensors, from other carts, and from servers or other devices that communicate with the cart via the antenna. The underbelly also contains a position sensor unit (PSU) 120, such as an Intertial Measurement Unit (IMU), that measures acceleration (including the constant acceleration of gravity, which indicates whether the cart is going up or down) and the rate of change of orientation.

Figure 1D:
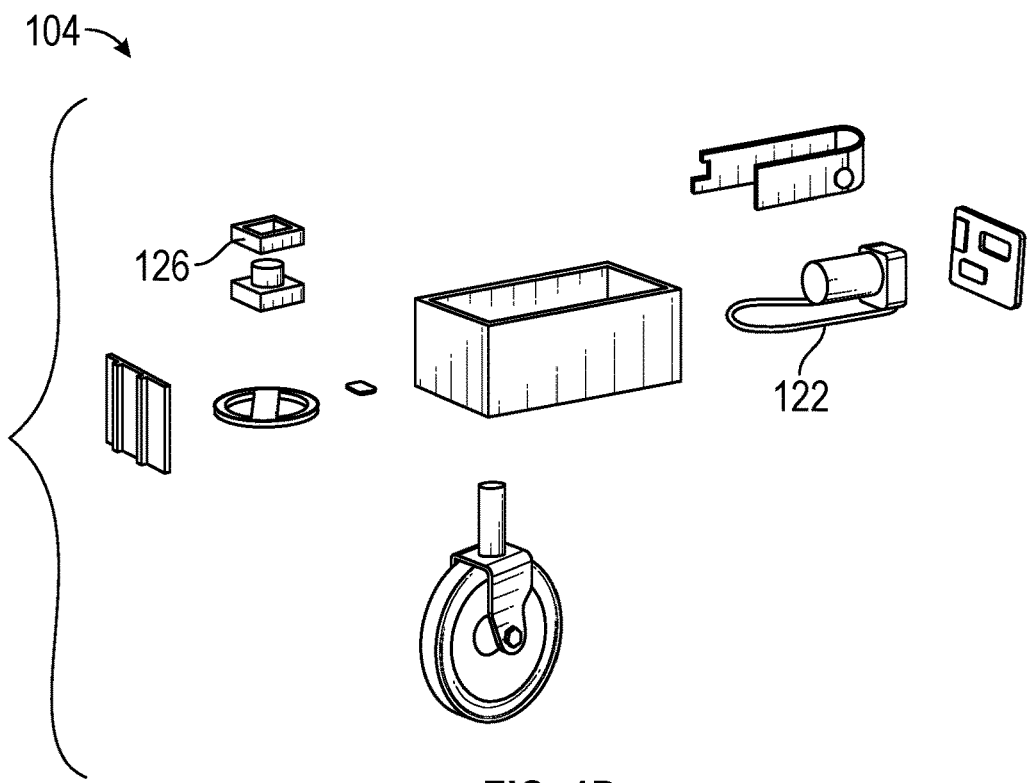
FIG. 1D is an exploded view of a drive train unit for the autonomous cart of FIG. 1A.

FIG. 1D shows an exploded view of a drive train unit 104. The drive train unit includes a steer motor 122 that turns a wheel mounted on a vertical axis. It also includes an encoder block that can measure the number of rotations of an axis coupled to steer motor in order to provide an indication of how far the cart has moved and how fast it is moving or has moved. A load cell 126 mounted in or on the drive train unit measures force exerted on the cart as explained in greater detail below. The load cell 126 can be located next to the encoder within a single block of aluminium, on the opposite side of the steering motor, on the output shaft, or in any other suitable position. The drive train unit 104 may include a brake (not shown) to slow the cart or keep it from moving.

The drive train unit may also turn the wheel slightly inward, much like snowplowing when skiing, to slow or stop the cart or to keep it stopped. Turning the wheels slightly inward is relatively easy to control and very effective, even on an incline. Each wheel includes a drive train unit and a steering motor and can drive and turn independently, enabling holonomic motion of the autonomous cart.

The autonomous cart shown in FIGS. 1A and 1B can operate in areas where things change frequently: It can determine where it is and automatically re-map its position/environment without human intervention, even if pallets, racks or walls are moved. It can have more collaborative and intuitive interactions with people through camera-based gesture control, e.g., for signaling cart ("I'm done," "Stop," "Move on"), for triggering actions based on visual cues (e.g., positions of objects w/in the environment; door opens, pallet is empty, etc.), and for safety (e.g., slowing down or in response to flashing lights or when near a human operator);

An autonomous cart can automatically avoid drops, such as stairs or loading docks, that are not easily detected with horizontally oriented LIDAR. It does not need "recovery zones" normally needed for 'lost robots' after a reboot or a physical move when turned off. It can provide a night-security service because they can identify even very small changes in their surroundings. It offers picture-based "come to me" control. Its position can be easily adjusted by operators through "Push-to-Move," enabling an operator to literally push the robot when they want to move it or change its orientation. It can measure the mass of the load placed on top of the cart and can use that mass to trigger actions such as to depart a waypoint, or to move slower with a heavy load, or stop if overloaded. And they can venture outdoors into bright sunlight, which is not possible with some computer vision technologies.

The Chassis

Figure 2:
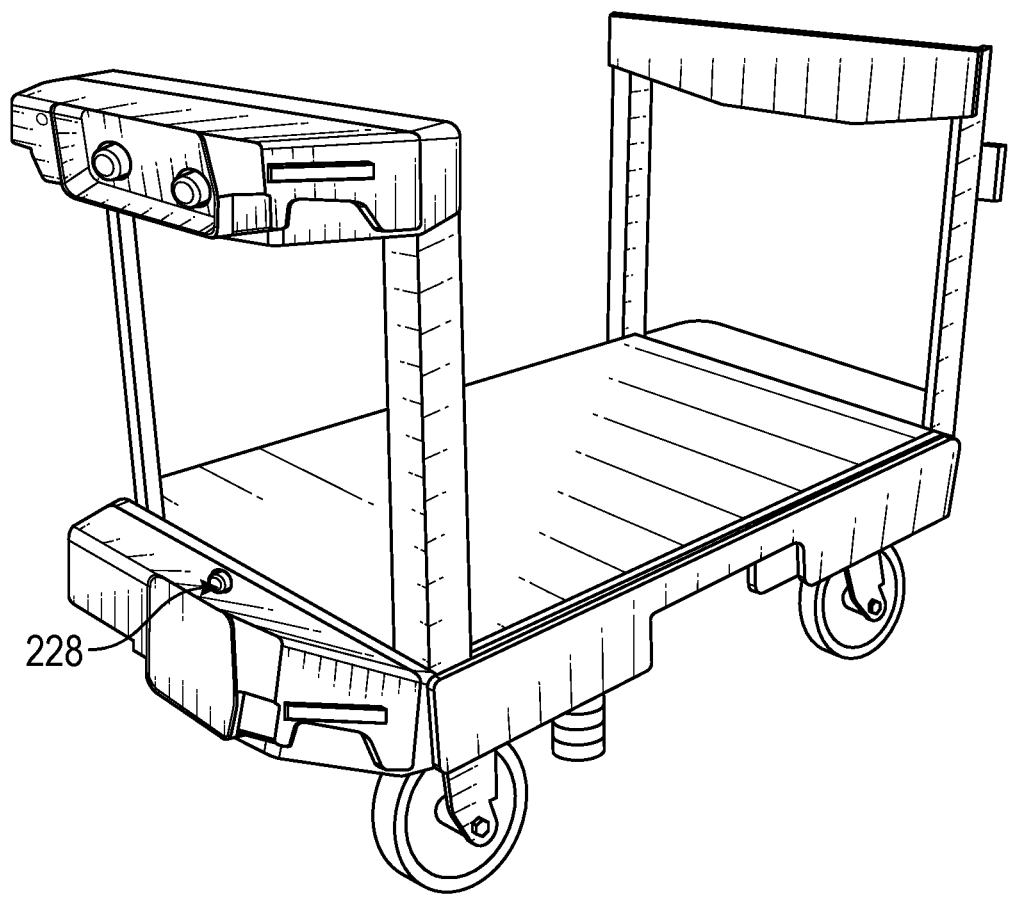
FIG. 2 is a photograph of an autonomous cart without a second shelf.

FIG. 2 shows the chassis 228 of an autonomous cart 100. The chassis 228 may be constructed from aluminum sheet and tubing and machined aluminum and plastic parts and is designed to be flexible in overall dimensions depending on customer requirements and desires. It typically has a minimum length of 36" and a minimum width of 24", but it has modular components so that it can be expanded in either direction. The cameras are usually mounted at heights of approximately 30-36" to get useful views of surroundings, but shelves can be lower or higher within reason. FIG. 2 shows the basic configuration, which includes a lower shelf above the wheels/batteries/drives. Typically a second shelf would be added at any height (which can be changed by the user in minutes by moving the shelf vertically) as shown in FIGS. 1A and 1C.

The entire chassis is floating on four load cells, one for each wheel/corner of the cart. This enables the features outlined below which are based on measuring load on each of the four load cells.

The Wheels and Swerve Motors

Figure 3:
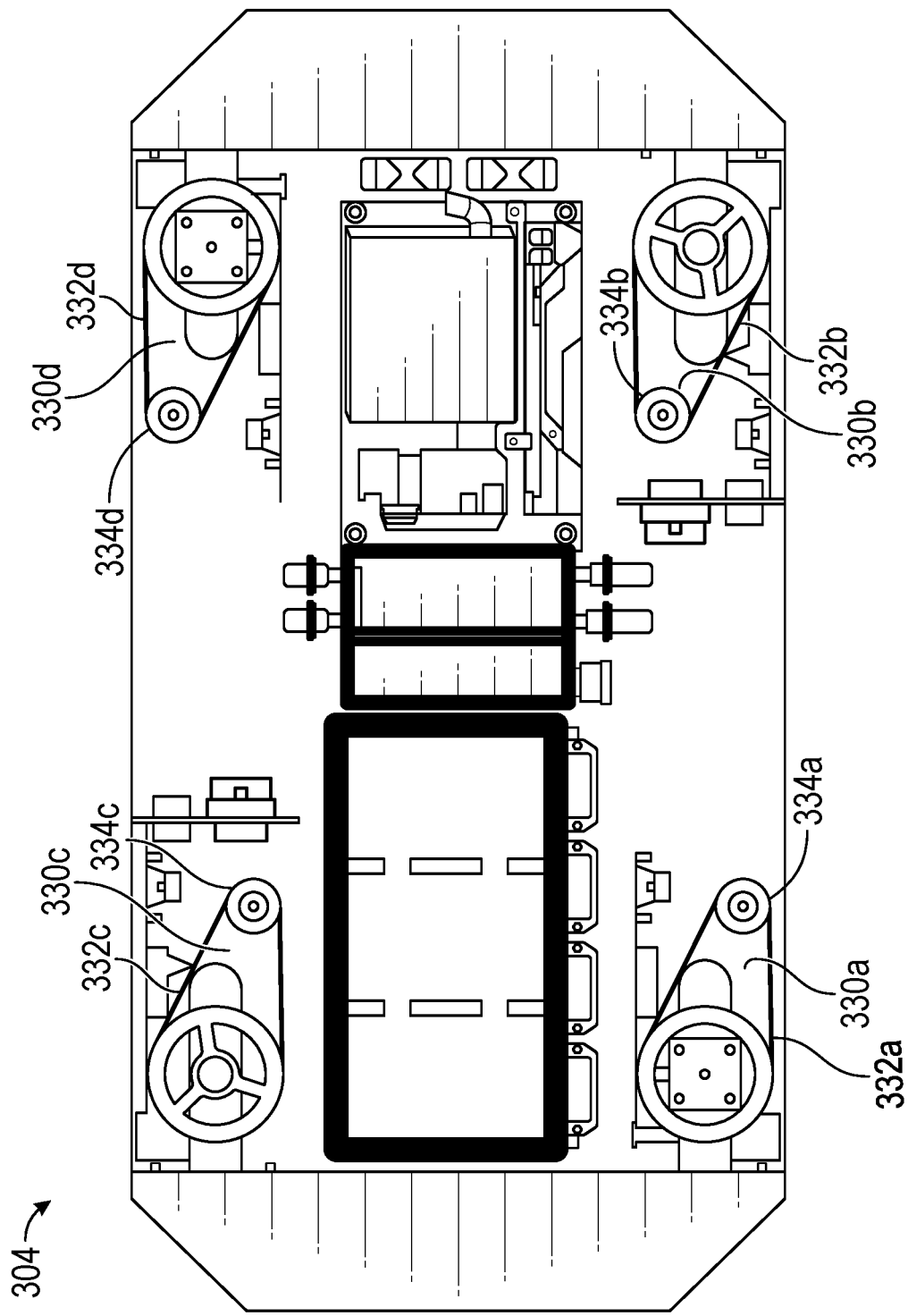
FIG. 3 is a cutaway view of the base of an autonomous cart showing four wheel assemblies with steering pulleys and motors.

FIG. 3 shows the cart's drive system 304, which includes four wheel assemblies with wheels 330a-330d (collectively, wheels 330), steering pulleys 332a-332d (collectively, steering pulleys 332), and motors 334a-334d (collectively, motors 334). The drive system 304, in which the steering axis is vertical, is a swerve drive. It is more difficult to control but provides more maneuverability than a standard arrangement in which the steering axis is at a slight angle, or a skid-steer arrangement like many off-road vehicles. The swerve drive uses off-the-shelf wheel motors to drive, and off-the-shelf steering motors to turn. The rest of the design is custom and provides strength, reliability, simplicity of maintenance and assembly, and control.

Figure 4:
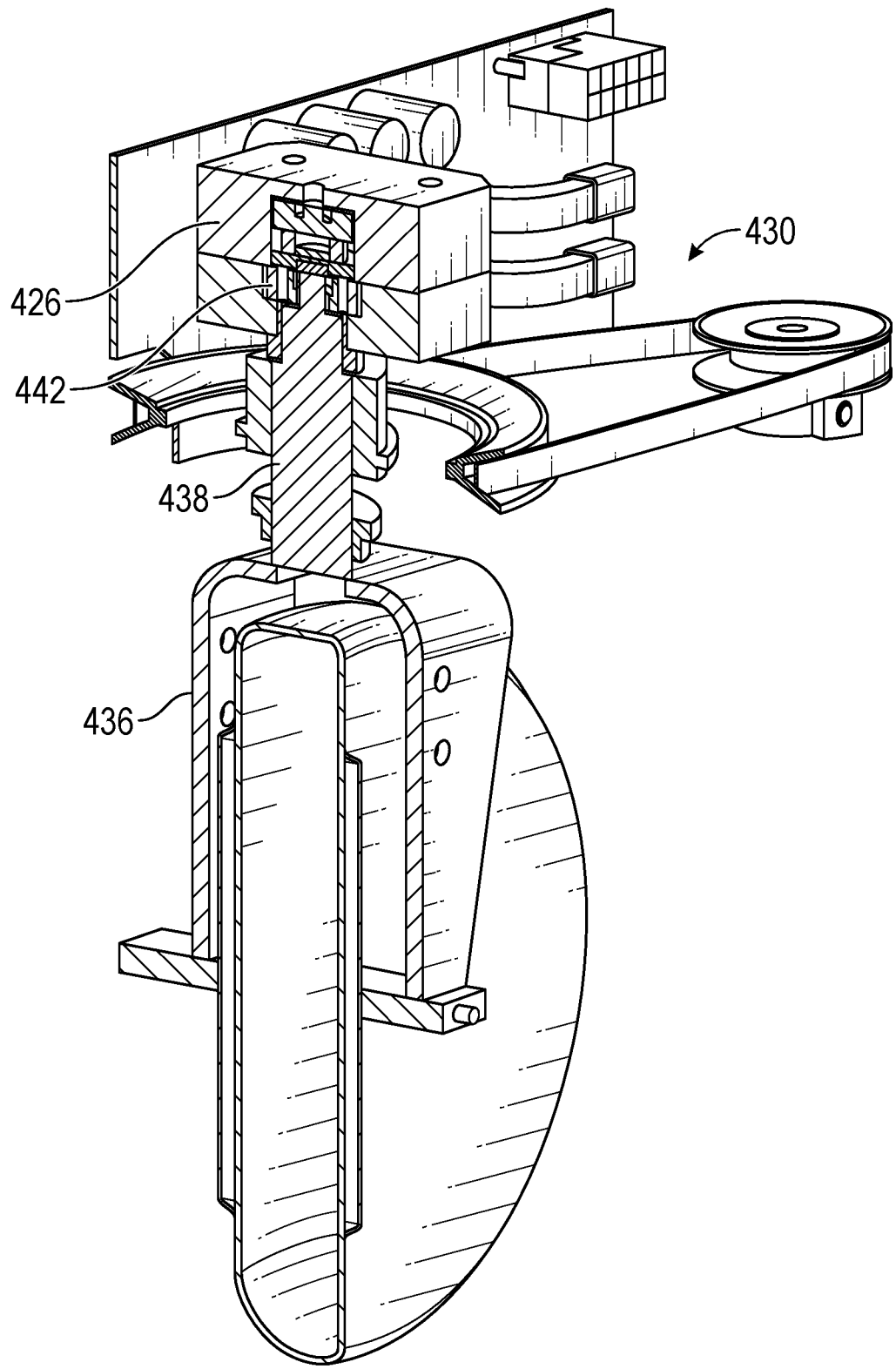
FIG. 4 is a perspective cutaway view of an autonomous cart wheel assembly, including a load cell block, encoder, steering shaft, yoke, and steering belt.

FIG. 4 shows a wheel assembly 430. Each wheel is held in place by a yoke 436, which is attached directly to the vertical steering shaft 438. The steering shaft 438 is held in place by an upper bearing and lower bearing, which allow the shaft 438 to rotate and move vertically. The vertical movement is critical because the steering shaft 438 pushes against a load cell 426 at the top, enabling the load cell system. The shaft 438 also turns an encoder 442 that provides rotational measurements to enable steering control.

The design enables holonomic motion: Steering can be front-only (like a car), rear-only, all-wheel, or crab. All-wheel-steer enables the robot to spin in place. Crab-steer enables it to move sideways. The ability to move in all of these ways enables better trajectory planning, allowing smooth motion even when compensating for any potential short-term flaws in perception or localization. It also enables the cart to move sideways, moving into positions where a front-only or skid-steer device would have to do a more complicated 3-point turn or parallel parking maneuver.

With large (e.g., 8" diameter) outdoor-rated wheels and a heavy steel yoke and shaft, the design allows operation over rough terrain such as rough concrete or dirt. Outdoor operation is useful for delivery between buildings on a factory campus, or for "last mile" delivery of goods to an end-customer from a regional warehouse or a retail outlet. To navigate outdoors the cart can use GPS to map its position relative to its surroundings, while continuing to use its camera-based perception to identify nearby objects, choose the best path forward, and avoid obstacles.

The Load Cells

Figure 5:
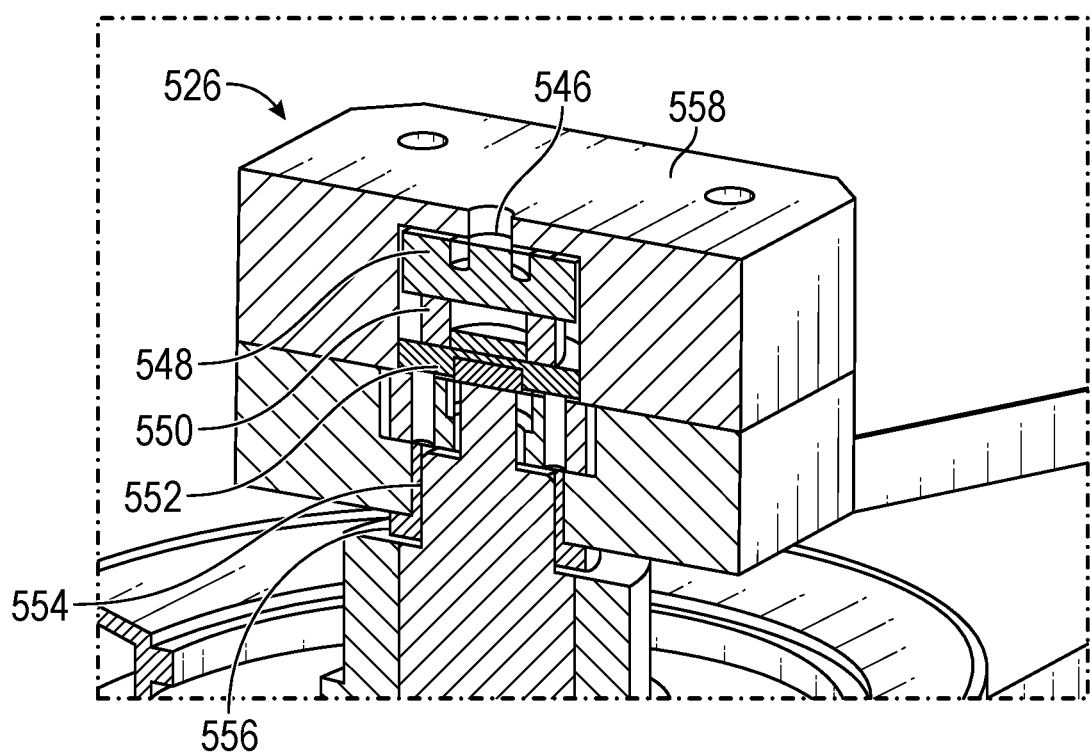
FIG. 5 is a perspective cutaway view of the load cell block of FIG. 4, including a pre-load adjustment screw, load cell, spring, force distribution plate, bearing, gap, and housing.

FIG. 5 shows a load cell assembly 526. There is a load cell above each wheel. The combination of four load cells enables:

1. A haptic interface for moving the cart by hand ("push-to-move");
2. Tallying weight put on and taken off cart, which enables automatic movement, such as departing a location once loaded or unloaded
3. Estimating center of mass location, e.g., for limiting speed for safety when accelerating or changing direction;
4. Limiting speed or stopping completely when overloaded;
5. Measuring loading and unloading time;
6. Measuring number of units on the cart;
7. Counting weight transiting a particular location in a factory or warehouse.

The load cell assembly 526 includes a pre-load adjustment screw 546, load cell 548, spring 550, force distribution plate 552, bearing 554 that enables vertical and rotational motion, and a gap 556 that enables shaft to move vertically. The gap 556 closes before the load cell 548 is overloaded. The housing 558 is attached directly to the chasis of the autonomous cart.

Mechanical Overview of Load Cells

The load cells may be any off-the-shelf load cell, such as a piezoelectric type, with a range suitable for the size/mass of robot and expected load. In some instances, the load cells use a range of 0-200 lbf. The load cells can be situated at the bottom or top of the shaft such that they are exposed to the entire vertical force acting on the wheels from above. The shaft can be held by bearings in such a way that the shaft is free to move linearly in a vertical direction, and rotate during steering, but not move laterally.

A mechanical stop somewhere in the system ensures the load cell is not overloaded. An example of the mechanical limit or stop can be seen in FIG. 5 in the form of the gap (e.g., gap 556 in FIG. 5) between the bearing and the shoulder of the steering shaft. As the cart is loaded from above, the shaft moves upward relative to the load cell, pressing upon it through the distribution plate and spring. If the movement is too far (e.g., more than 200 lbs) the lower shoulder of the steering shaft presses against the lower part of the bearing. The force then goes directly into the housing, reducing or eliminating the possibility of overloading the load cell. (In some instances, when the cart is in motion and encounters a bump, a high but momentary force is applied vertically on the housing.)

Software Overview of Load Cells

To obtain the weight of the payload, the weight of the cart body is subtracted from the accumulated total weight sensed by the load cells. This step is performed by onboard processors within the cart. This step may also be used to generate a signal that the cart is overloaded, which may be used by other components of the system to notify an operator or stop the cart's motion.

In order to detect commands that are given to the cart through moving its exterior, a classifier is trained on the input of all corner units within a given time horizon. This classifier may be an Artificial Neural Network, Support Vector Machine (SVM), or Expectation Maximization (EM) based machine learning system tasked with observing the inputs of the four corner unit load cells and signaling the likelihood that a particular command has been given to the cart. This classifier can be trained using a large body of labelled data where load cell recordings are correlated to known input commands with sufficient variation to enable a robust classification at run-time. One such set of commands is "push to move" where a user can push on the cart to turn the wheels in the direction of the push, thereby allowing the user to move the cart in a desired direction.

The labelled data can be generated by a program (e.g., a software program). That is, a classifier or other software program can be configured to label the data. In other instances, the data can be labelled directly by humans. Labels can refer to different types of events associated with the autonomous cart, for example, driving into/over a bump, catching a wheel in a large depression, sensing a human nudge, sensing a tap, sensing a double tap, sensing consistent pressure in a particular direction, detecting contact with a mating surface, and/or other types of events that are detectable via the sensors on the autonomous robot. The classifier can be trained to generate the same label for a similar event. In this manner, the classifier can identify an appropriate reaction for the cart for a future event based on the labelled data (e.g., substantially similar events can have same labels and therefore similar reactions).

System Architecture and Overview

Figure 6:
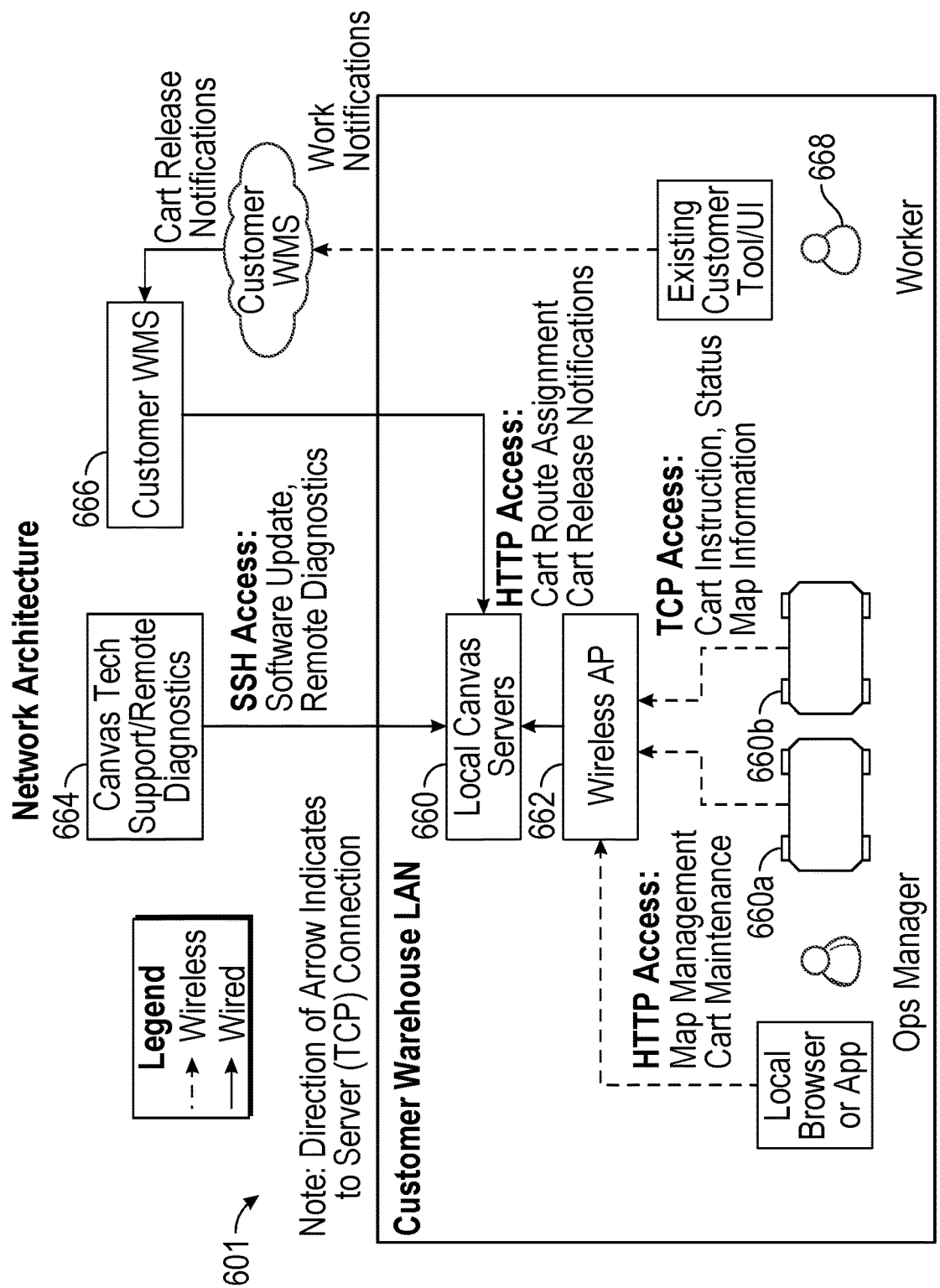
FIG. 6 is a diagram of a network architecture for operating a fleet of autonomous carts in a warehouse or manufacturing facility.

FIG. 6 shows a typical autonomous system 601 configuration. In this configuration, one or more carts for example, 600a and 600b (collectively, carts 600) connect to one or more local servers 660 via one or more wireless access points (APs) 662 (e.g. 802.11n, 801.11ac, etc.) Carts 600 send and receive map information to/from a local server 660. Carts 600 receive a set of commands from the server 660, execute them, and report status and progress back to the server 660.

In addition to maintaining communications with the carts 600, the local server 660 also hosts a web interface. This interface allows external actors (such as a facility operator or owner or a facility operator (e.g., worker 668) or owner's Information Technology (IT) infrastructure (e.g., 664)) to submit requests to the carts 600, monitor or audit their progress, and route other signals to the carts 600 (e.g., give the cart 600a and/or 600b permission to proceed to its next stopping point.) It also contains a map-viewing and map-editing interface, so that facility operator or owner (e.g., 668) may define 'routes' for the carts 600 to take, monitor the carts' 600 progress along routes, and perform other maintenance activities such as sending a cart to an area and powering it off for maintenance, initiating software upgrades, etc.

The local server 660 also collects and stores information about the map, the progress of the carts 600, and other data emitted by the system 601. This information may be used for various types of online and offline analysis, e.g., miles driven per cart, average time spent at each cart destination, amount of observed congestion/traffic in an area, etc.

Figure 7:
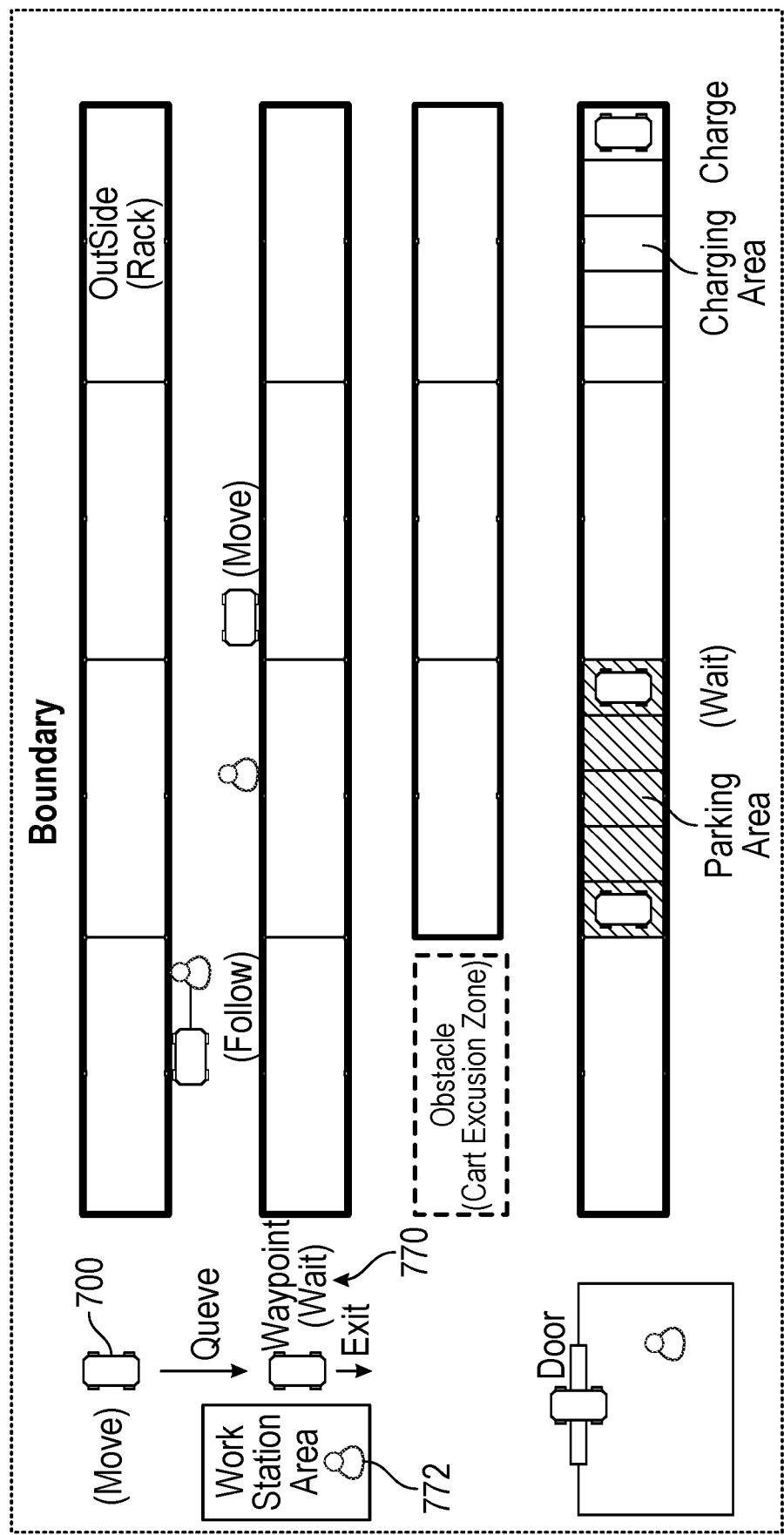
FIG. 7 illustrates elements autonomous cart system and behaviors of autonomous carts in a warehouse or manufacturing facility.

FIG. 7 shows some of the typical behaviors exhibited by carts. On the top left, a cart 700 moves towards a waypoint location 770 near a customer's workstation 772. There, it may wait for some action to be taken (e.g., for a certain amount/mass of product to be added/removed to/from the cart 700, for a release button to be pressed, for an external signal from the customer's warehouse management system, etc.) before it departs the waypoint 770 and heads to the next location. The cart 700 may also exhibit other actions, such as parking in a quiet area until work becomes available, or charging at an automatic charging station when its batteries are low.

In addition to following pre-defined routes between workstations, carts may exhibit a follow behavior, tracking and following a specific user or object that it has been trained to follow. Similarly, it may be given an ad-hoc 'waypoint' to visit, either expressed as a physical location in the map or possibly 'hinted' to the cart by snapping a photo of the desired "come to me" location via tablet/cellphone/etc. and relying on the system to use its collective visual memory of the world to identify and proceed to that area.

In addition to defining waypoints in the map, the system also understands the concept of 'areas', often expressed as polygonal (or other) shapes. These areas may be assigned particular characteristics. For example, a boundary area allows for cart motion inside its volume, but disallows motion through its border. Similarly, an obstacle area allows motion outside its volume, but disallows motion within.

Other more subtle uses of areas are possible as well. A door area hints to the system that a perceived wall area may actually be temporary in nature, as is the case with automatic doors. A door may be treated as a passable area for planning purposes, allowing carts to approach and use passageways that otherwise look impassible to the cart's vision system.

Charger areas serve as a hint to the system that an area may contain usable chargers (observable/detectable by the vision system) that may be explored and used for automatic battery charging. Parking areas inform the system that a particular area should be used as an automatic parking area for carts that are otherwise idle.

The Web Interface

Figure 8:
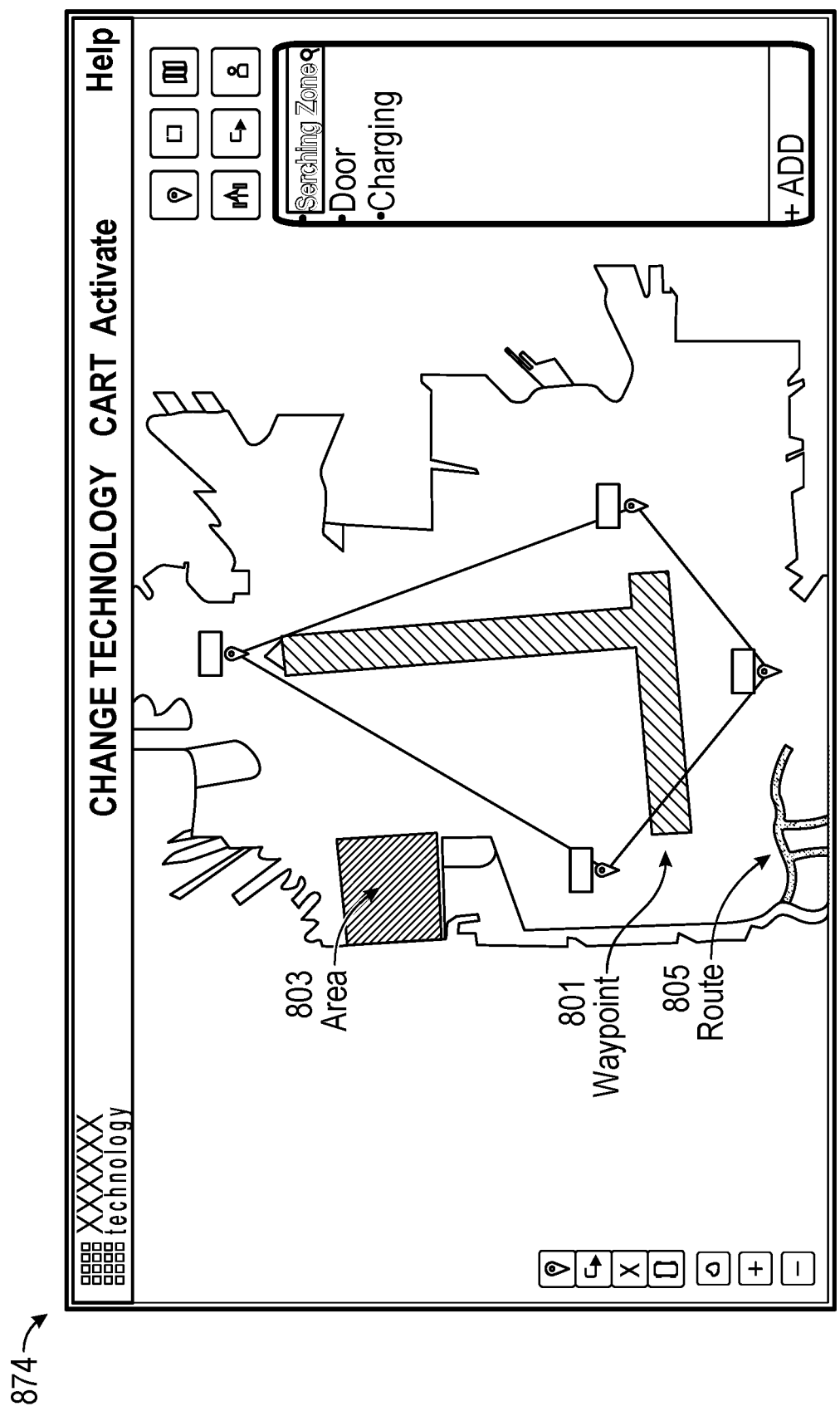
FIG. 8 is snapshot of a web- or app-based user interface for monitoring and controlling one or more autonomous carts.

FIG. 8 shows a snapshot of the web interface 874 for controlling an autonomous cart (e.g., autonomous cart 100 in FIG. 1A). FIG. 8 shows a top-down view of the world, where gray represents passable area, and white represents impassible area (obstacles.) This is a visualization of a "costmap," which is constructed by the carts and used in path planning and path execution to gauge traversability of the environment. Here, the costmap is rendered as a base layer within the web interface.

The snapshot in FIG. 8 also depicts one cart, shown in gray because it is currently offline. The cart's location and status are updated dynamically as they change.

Users may annotate the costmap with features such as waypoints, areas, or routes. Routes are a list of waypoints to be continuously traversed/visited by one or more carts. These features may be indicated with different colors, shading, etc. In FIG. 8, for example, waypoints 801 are connected together via routes 805. Areas 803 are annotated as polygons on the map, with colors that vary by area type (e.g. door, obstacle, parking, charging, etc.)

Carts may be assigned to (or removed from) routes, and/or sent to (existing or ad-hoc) waypoints via the web interface.

Figure 9:
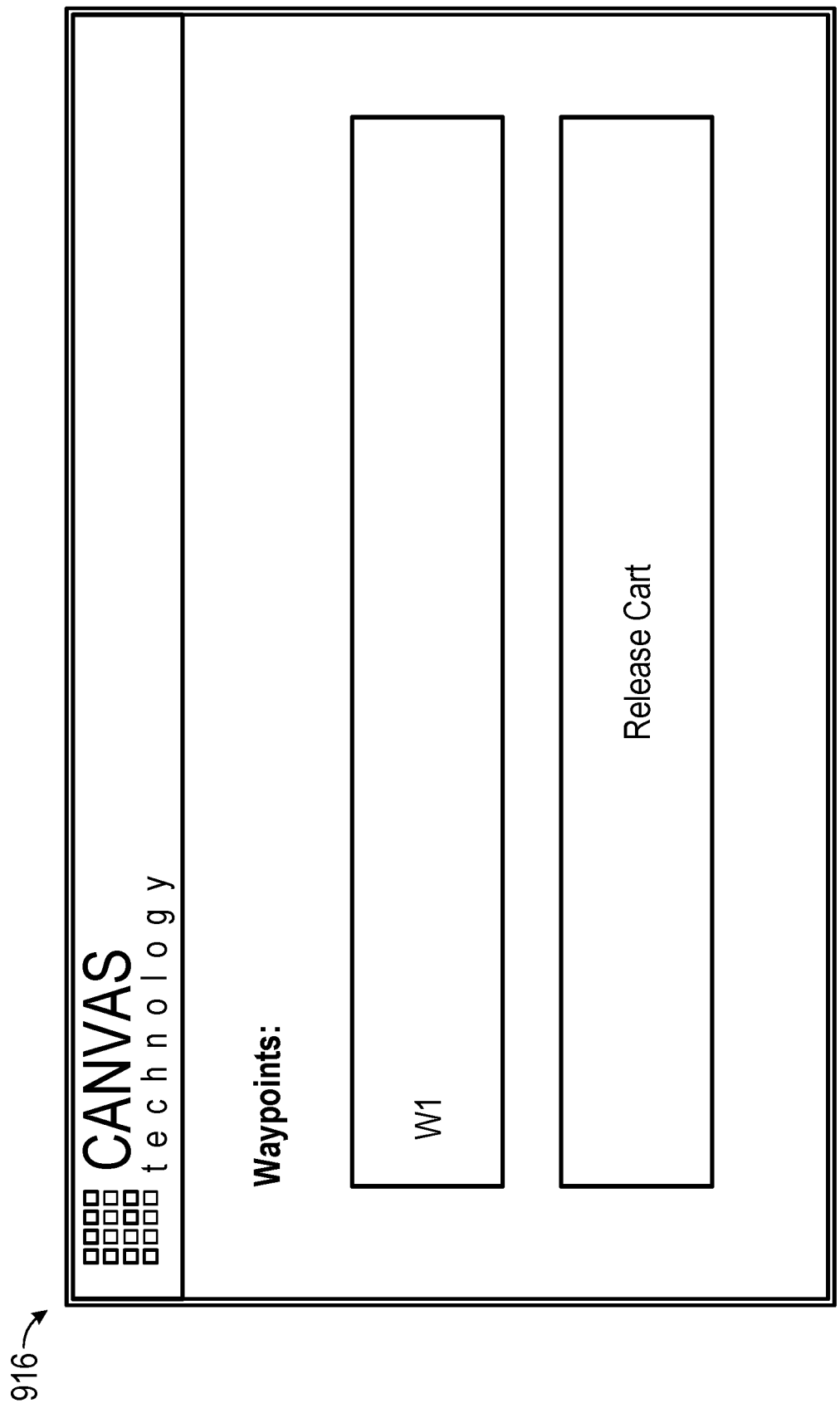
FIG. 9 is snapshot of a web- or app-based user interface for releasing an autonomous cart.

In addition to a featureful maintenance-style interface, simpler dedicated-use interfaces are also provided/supported by the server. For instance, FIG. 9 shows an interface 976 used on phone and tablet form-factor hardware. This interface allows a user to release a cart from a workstation waypoint with the touch of a finger.

In addition to providing user interfaces, the autonomous cart system provides application program interfaces (APIs) for customers to integrate their own pre-existing tools. Customer-facing APIs allow routes to be defined, carts to be assigned to routes, carts to be commanded to or released from waypoints, and so on.

Metrics such as distance driven, number of routes completed, number of stops completed, total amount (in mass) of product moved, etc. may also be calculated from local server data.

Because the system uses cameras to construct a virtual representation/map of the world and to track cart position, there is much additional information that may be gleaned from this data, as discussed below.

Software Block Diagram—Local Server (Web and Map Server)

Figure 10:
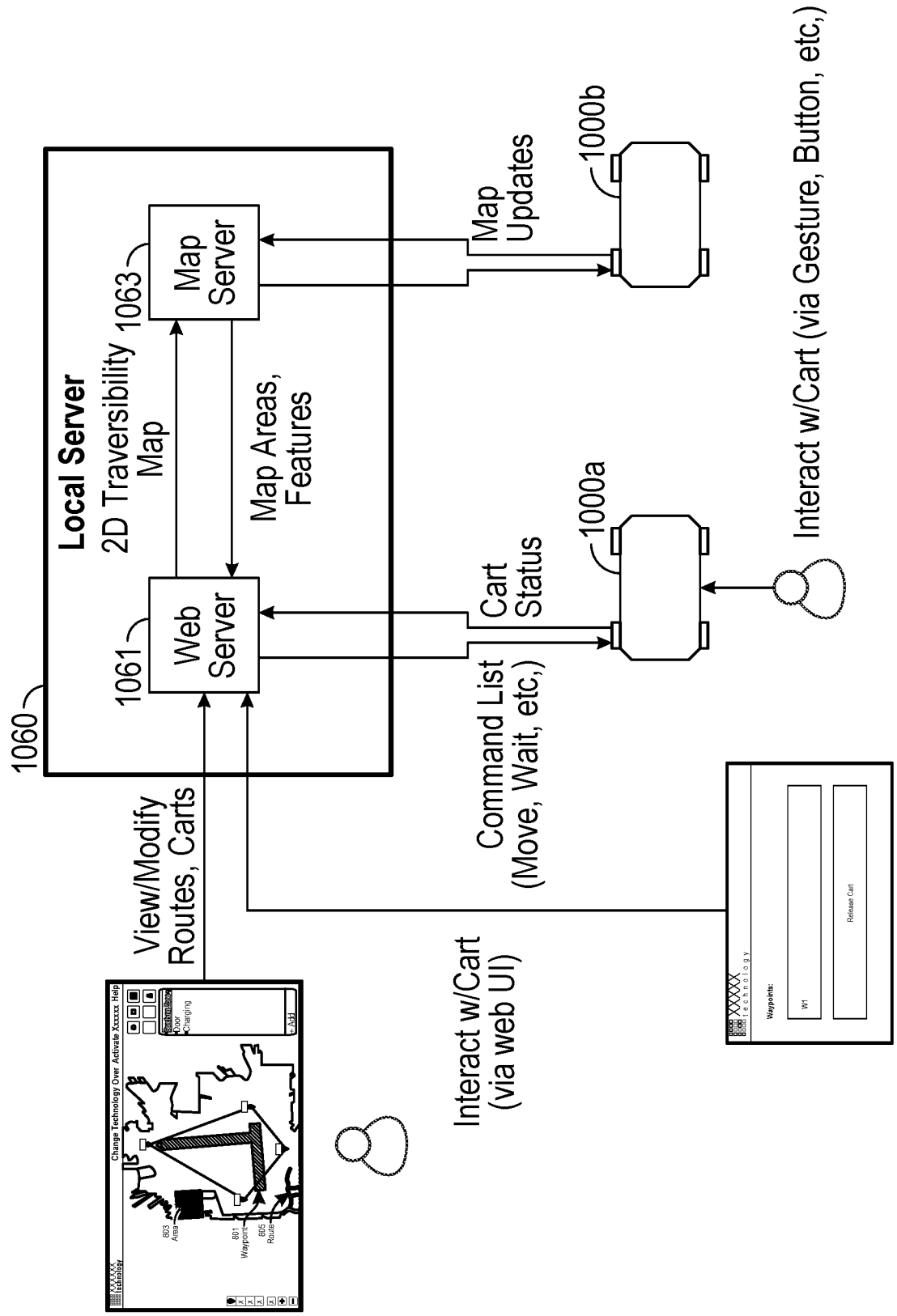
FIG. 10 illustrates data flow among autonomous carts, a local server including a web server and a map server, and web-based user interface.

This section describes components running on the system's local server 1060 that can be functionally similar to server 660 in FIG. 6. FIG. 10 shows the local server 1060 and two of its components—a web server 1061 and a map server 1063—as well as data flow to and from the web server 1061 and the map server 1063.

The web server 1061 performs multiple functions. It provides a map editor to users, and a way to observe and change cart status. It serves as the storage container for waypoints and routes. It sends commands to the carts (e.g., carts 1000a and 1000b, collectively, carts 1000) and monitors their status. It manages the assignment of parking spots and chargers to carts 1000. It also serves as a cart-release notification proxy for other tools, such as the tablet/phone interface illustrated in FIG. 9.

The map server 1063 fuses together observational data from individual carts, such as, 1000a and 1000b into a cohesive, consistent map that all carts 1000 share. Without fusion of shared data, each cart would retain its own world definition; the process of fusion interleaves data from multiple carts into a singular world definition, which is then propagated back to the carts so that the carts, web users, and any other consumers of this map information may wish to operate and/or communicate within a common world perspective or frame of reference. That is, information from multiple carts can be shared and combined into a single cohesive map. Note that a cart may operate for long durations without sharing with other carts—in these cases, a cart may fuse new observational data locally that is subsequently shared with the map server and then also superseded by the map server's unified perspective.

Methods and Processes of Using Autonomous Carts

Continuous Map Creation and Sharing Across Vehicles/Entities

The systems disclosed herein combine online/continuous mapping of a dynamic world with the ability to define stable points/features in the user interface (UI). Combining online/continuous mapping of a dynamic world with the ability to define stable points/features provides a powerful type of flexibility not necessarily found in a distinct mapping/map curation process. For example, with conventional robotic carts, the end-user typically uploads or creates a computer-aided design (CAD) map of the area the where robotic carts will operate, and that map does not change in the user interface, regardless of what the robotic cart discovers as it moves through the area. Conversely, an autonomous cart automatically creates a map on its first journey through an area and then continually updates the map and provides updates to the user.

For example, when a cart passes through an area, it may observe the 3D geometry of a space, the presence or absence of recognizable objects and their positions, the traversability of the space, and/or other features of the cart's immediate environment that are detectable through the cart's sensory input. The cartmay retain that information locally, and/or share that information with a map server. With subsequent passes through the area, the same cart or a different cart may observe similar or different features and their relative positions, and may optionally share these observations. These observations constitute a hypothesis about the state of the world relative to the cart's known position, which may then be fused with prior hypotheses by a map server, or by individual carts sharing a common set of fusion logic, to generate a singular hypothetical world definition that represents the amalgamation of all prior observational data.

In some instances, the observations by sensors can be calibrated and thus the fused perspective is influenced by the quality of individual sensor calibration in each cart. Sensor calibration may be manual (e.g., calibrate image sensors with a known object, calibrate load sensors with known weight, etc.) or automatic (e.g., calibrate image sensors by sensing how the scene changes as a vehicle moves through it). Sensor calibration may be an offline process (e.g., invoking a separate calibration mode) or online (e.g., cart self-calibrates as it moves through a specific scene and/or any scene).

The following terms may be helpful in understanding the processes used by an autonomous cart to map and navigate its environment:

Keyframe: A set of 3D visual information (e.g., camera images, 3D depth 'maps', and related information) collected by a vehicle at a specific point in space. FIG. 11 shows a keyframe and how a keyframe ties visual information to a specific point in space. A keyframe can include a collection of low or high resolution images, including but not limited to one or more (e.g., monocular or stereo) color or grayscale light intensity images, 3D depth images, and derived images such as 2D or 3D traversability maps, or sets of visual features recognized within the visual information. Keyframes can include a handful of bytes of information to many tens to hundreds of megabytes of information, depending on the resolution and dynamic range of the image sensors used to capture the information, and the amount of pre-processing performed on the images.

Keyframe Edge: A relationship that connects or relates one keyframe to another. Each edge usually includes an estimate of the relative distance (in 3D space) between two keyframes. FIG. 12 shows how keyframes are connected via edges to form a map.

Map: A series of keyframes connected together by edges.

Costmap Tile: A 2D image (e.g., a planar image) that represents the traversability of an area. A costmap tile is generated (projected into 2D) from 3D visual information such as that captured in keyframes. FIG. 13 shows how 3D information from multiple sources (including keyframes and/or other captured visual information) is converted into a 2D traversability image (costmap tile) that is shared across carts and used for planning purposes.

Costmap: A set of costmap tiles that represents the traversability of all known/explored space. Used for map visualization (on the website) and path planning.

The Map Server and Map Curation

The map server is responsible for building and maintaining a consistent visual and navigation map (and costmap) using measurements obtained from multiple carts. As such, the map server is the reference for both the costmap and the visual map. A cart may, at any time, request to receive the latest visual and costmaps from the map server. As carts explore the environment and obtain new visual measurements, they forward these measurements to the map server, which incorporates them into the canonical map. A canonical map is the singular world definition that is shared with the carts, web components, or other consumers of map information. It is primarily comprised of (or derived from) keyframe data. In one instance, the canonical map can reside on the map server, and can be generated by fusing together the data (e.g., keyframe data) collected from one or more carts and/or other contributing vision systems. It can be disseminated to consumers of the canonical map (e.g., the website and the carts). In some instances, the individual carts or other client devices can maintain their own maps so that they do not have to reference or access the canonical map continuously. The map server may then update other carts with the map updates so that all carts use a unified map representation. This allows all carts to benefit if a single cart explore and maps a new area or updates an area of the map due to a change in the visual appearance.

The cart updates can be in the form of keyframes, loop closures, and live costmap data. Keyframes (FIG. 11) form the basis of the visual map. When carts map new areas or encounter significant visual changes in the environment, they generate new keyframes which are then linked to existing map keyframes via visual localization estimates. For example, a visual localization estimate can be generated by detecting the presence and location of a visual feature in one frame and/or keyframe. The presence and location of the same visual feature can then be located in another frame and/or another keyframe. The estimated portion or pose of that feature in the first frame is then equated to the estimated position or pose of the feature in the second frame, thereby relating the positions of the frames to each other. New keyframes created by the carts are sent to the map server, which incorporates them into the map and updates other carts with the keyframe information.

Loop closures are instances when a visual estimate is computed between the current location of the cart and a keyframe in the map. These loop closures can connect different areas of the map together and correct incremental visual odometry errors. When a cart detects such a loop closure, it sends the corresponding estimate to the map server, which incorporates it into the graphical model which represents the visual map and computes a new optimal pose estimate for all map keyframes. This new estimate is then sent back to all carts. In some instances, the map server can also detect loop closures.

FIG. 14 shows how carts A and B may typically share 'fused' keyframe data through a common server. Solid lines/figures represent information generated on the carts, and dotted lines represent information shared with (and provided by) the map server. In this example, cart A generates a series of keyframes with visual localization estimates (solid lines) and then shares them with the map server. These become part of the map server's canonical map (dashed lines). Cart B is then supplied with a copy of the canonical map, and is able to generate a visual localization estimate of its position relative to the canonical map's keyframes. Cart B then moves into an area not covered by the canonical map, and generates keyframes that are connected to its copy of the canonical map via visual localization estimates (solid lines). As cart B generates keyframes, they are shared with the map server. Once a loop closure is detected between one of Cart B's visual keyframes and the canonical map, the map server may fuse cart B's keyframes into the canonical map. This is then shared with cart A, cart B, and/or any other users of the canonical map.

The Map Server and Costmap Curation

In addition to collecting and curating map data, the map server collects and curates live costmap data collected from the carts. As carts observe the world, they send costmap tile updates to the map server, which incorporates the updates into the canonical costmap and distributes them among all carts. Each transmission event (update) may be as an example triggered by a cart observing an area of the costmap that is significantly different from the canonical costmap sent by the map server.

Figure 15:
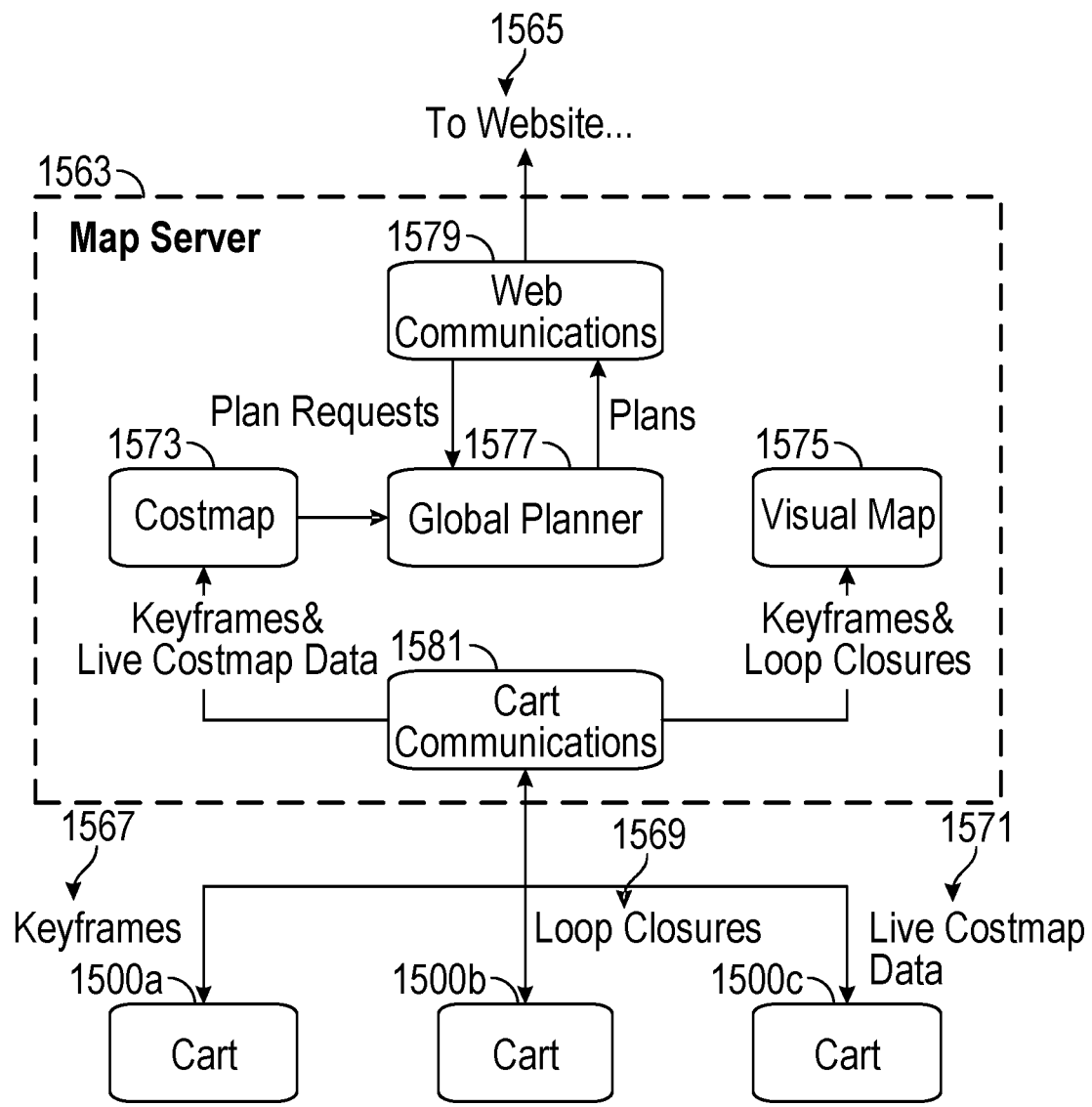
FIG. 15 shows the map server's internal components and relationship to carts and the web server.

FIG. 15 shows the map server's 1563 internal components and relationship to carts 1500 and the web server 1561. This diagram shows the map server and its communication channels to the carts 1500 and the website 1565. As aforementioned, the carts 1500 may send keyframes 1567, loop closures 1569, and live costmap data 1571 to the map server 1563, which in turn may reply with costmap and visual map updates. The map server holds the canonical costmap 1573 and visual map 1575 internally, and shares it with both the carts 1500 and the web server 1561.

Path Planning and Path Execution

Figure 16:
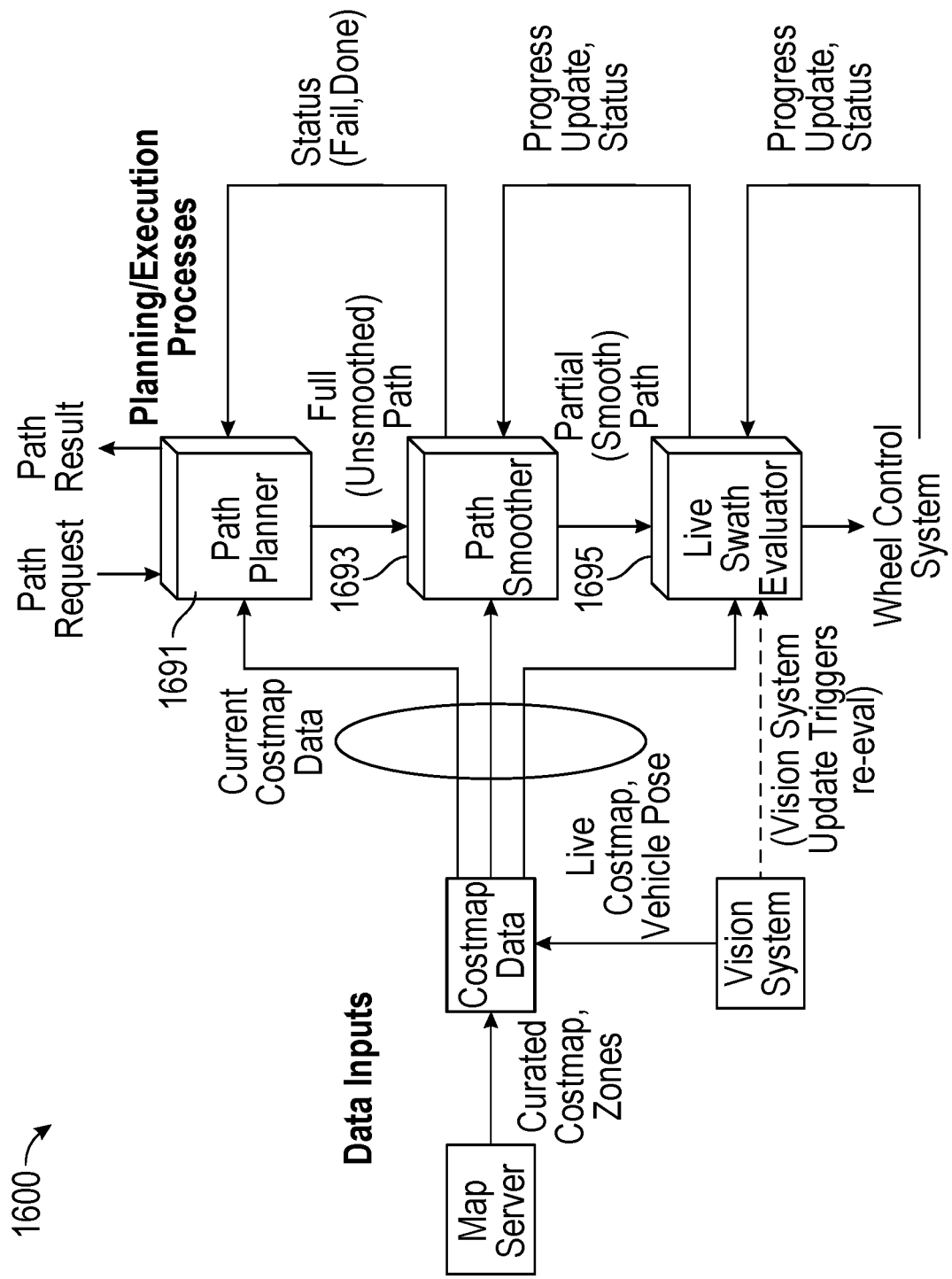
FIG. 16 illustrates a path planning, smoothing, and live evaluation process performed by processors and sensor on an autonomous cart.

FIG. 16 shows a process 1600 used by an autonomous cart to plan a path through space and to move through space. Each cart is capable of planning and evaluating its trajectory through the environment. Trajectory planning occurs in three steps: (1) path planning 1691, (2) incremental path smoothing 1693, and (3) continuous live swath evaluation 1695.

The process of path planning is as follows and can be performed by the processors 1691 and sensors on each cart:

1) The cart's planner retrieves the current costmap and combines that information with area definitions (doors, prohibited areas, etc.) to generate a top-down 2D traversability map of the world. The map includes both basic traversability information (e.g., is the location traversable by a vehicle) as well as other policy information that applies to that location (e.g., speed-limit policies, assumptions that the space contains only temporary obstacles such as a door, etc.)
2) The cart identifies the start pose of the cart and the desired end pose(s) of the cart (the goal location(s).)
3) The cart utilizes one or more search algorithms (e.g., A*, D*, D*Lite, Djikstra's algorithm, etc.) to evaluate a possible set of maneuvers that the cart may perform to arrive at one or more of the goal location(s). Typical path planning search algorithms decompose the problem of path finding into the evaluation of a series of distinct maneuvers or motions.

Figure 17:
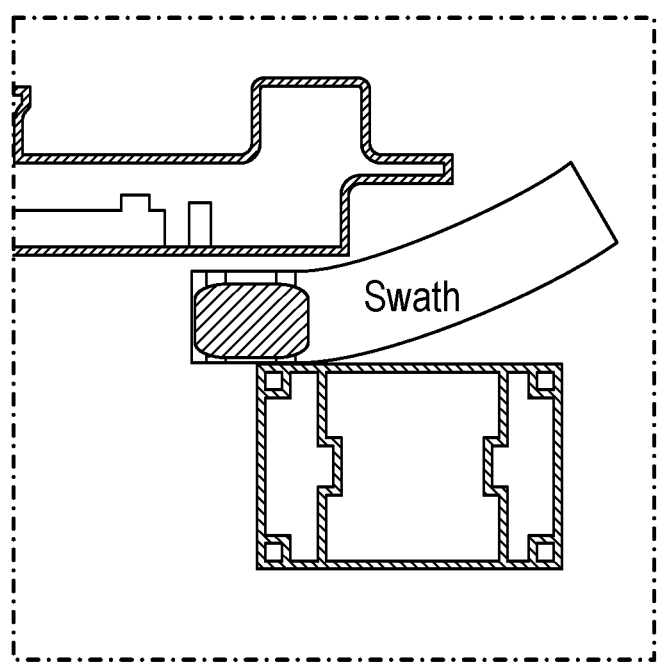
FIG. 17 shows an example of a swath, which is typically evaluated against a costmap (a traversability map) to determine the viability and cost of a particular motion.

During evaluation of each possible motion, a 2D representation of the cart's swept volume may be generated, where the swept volume of a cart is comprised of the sum of 2D footprints that a cart must occupy in order to execute a possible motion. FIG. 17 shows an example 2D representation of the cart's swept volume, which is called a "swath." For each evaluated motion, the motion's swath is compared to the 2D traversability information (created in step 1) on a location-by-location basis, in order to generate a cost for and/or feasibility of that motion. Many formulae may be used to generate a cost estimate for the motion, e.g. the total cost may be the sum of individual costs calculated for each x,y location that the swath intersects with the 2D traversability information, or it may be the maximum of these costs, or the minimum of these costs, or any other combination of per-location costs. Different costs may be calculated based on the union of per-location costs, or the presence/absence of per-location attributes from the 2D traversability map that are found to intersect the footprint of the swath. The feasibility of a motion may be determined by evaluating the presence or absence of certain per-location attributes in the 2D traversability map that are found to overlap the swath. If feasible, the cart's planner calculates a cost based on the evaluation of the location-by-location overlap information and associates that cost with the motion, which, as described before, is then combined with the cost of arriving at the prior state to determine the total cost associated with arriving at the subsequent state. Depending on the type of search algorithm used, multiple feasible paths may be generated, and the algorithm in use may elect to choose or find a low cost path over other alternate higher cost paths.

4) Once a feasible path is calculated to the goal(s), the plan is passed to the path smoother, which implements the path smoothing process described below.

Incremental path smoothing is as follows and can be performed by the processors 1693 on the cart or offloaded to a server wirelessly coupled to the processors on the cart:

1) Upon receipt of a planned path, the path smoother selects a subset of all motions specified in the path (specifically, a subset of the first-N motions within the path.)
2) The path smoother generates a traversability map for this space associated with the first-N motions (generally, the same information as calculated in step-1 in path planning.)
3) The path smoother optimizes the first-N motions within the path such that they maximize the smoothness of the motion of the cart, subject to the constraints of the traversability map.
4) The path smoother provides a 'smoothed' trajectory to the live swath evaluator component (described below).
5) When the smoothing system has detected a certain amount of progress along its provided smoothed path, it repeats step 2 above, incorporating remaining portions of the smoothed path with additional/new portions of the path previously provided by the path planner but not processed by the path smoother.

Incremental path smoothing can be performed before the cart is in motion and during cart motion. Incremental path smoothing can improve the smoothness of the trajectory of the cart. For instance, it may be used to provide finer grained corrections to make a path more ideal than the one generated by the path planner (e.g., to favor avoiding getting too close to other obstacles, taking too tight of a turn, etc).

The live swath evaluator 1695 performs an evaluation of smoothed motions when smoothed motions become available or when new costmap information becomes available from the vision and other sensor systems (usually several times per second) The live swath evaluator performs the following process for live swath evaluation and can also be performed on the cart's CPU or GPU or with one or more servers coupled to the cart:

1) The live swath evaluator generates a traversability map, using the latest/most-current costmap information as generated by the vision system.
2) The live swath evaluator determines if any of the smoothed motions violate any hard constraints in the traversability map. Hard constraints can include any sort of feasibility violations, such as may be the case when a motion's swath is found to overlap 2D traversability locations that are annotated as off-limits for that cart, or annotated as containing an obstacle, or is found to be constrained by some other criteria.
3) If any hard constraints are violated, the live swath evaluator rejects these motions and any subsequent motions within the path (see 'exception handling' below.) If no constraints are violated, the system allow these motions to be executed by the wheel control system.
4) This process repeats as new sensor information arrives (usually several times per second) or until the wheel control system has successfully executed the motions provided to it by the live swath evaluator component.

Exception Handling:

Exception handling can be performed on the cart or off the cart. Exceptions include, but are not limited to:

Live swath evaluation failure: In the event that live swath evaluation detects a hard constraint violation in the traversability map for any currently executing segments or proposed segments, the cart stops and starts to formulate an alternate path. It continues to monitor the characteristics of the traversability map via the live swath evaluation process. If the hard constraints disappear, it resumes the prior path. If the cart determines that it has waited for the constraints to clear for too long or that the constraints are unlikely to change (e.g. due to characteristics of the infringing constraint, e.g. velocity characteristics of an object in the traversability map) it discards its original path and begins the process of smoothing, performing live swath evaluation, and ultimately execution of an alternate path.

Path planning failure: If the path planner fails to successfully determine a path to the desired destination, the path execution module sleeps and then re-attempts to plan a path to the goal using updated costmap/traversability information. If no path is found, it generates paths to randomly/locally generated intermediary 'exploration' goals, in the hopes that this exploration behavior will reveal an alternate viable path to the goal. If exploration fails to reveal a path, the cart gives up, allowing the motion control system to process the failure and determine next steps such as announcing its failure and waiting for an alternate command and/or automatically beginning an alternate activity.

Applications/Context for the Autonomous Cart

The autonomous carts disclosed herein can be used in a factory or warehouse. They are also fully capable of going outdoors and can be used for outdoor applications. Within a factory or warehouse, the cart can be used by any company striving for improved efficiency. In particular, organizations that are attempting to become or sustain lean operations may benefit greatly from such an autonomous system.

A primary goal of a lean operation is to reduce the size of batches within any production system. One of the standard lean techniques is to set a goal of "one-piece-flow" whereby a single unit is produced at once, and a second unit is not made until the first has been consumed by the downstream process.

Reduction of the size of batches inevitably leads to increased traffic as smaller batches of product are moved more frequently. An autonomous cart can move small batches frequently, without the need for expensive and clumsy conveyor systems.

Lean Manufacturing

Typical use cases for an autonomous cart include, but are not limited to: delivering raw materials from storage to a production line; moving work-in-process goods along a production line; moving goods between production lines; and moving goods from production lines to packaging lines and/or to storage.

An autonomous cart also enables many unconventional concepts/capabilities. For instance, an empty cart can automatically trigger production of additional units because the operator knows that the cart will not arrive at that location unless more parts are needed downstream. This is often known as a "kanban within lean" terminology.

An autonomous cart can implement a 5S process in a factory or other environment by recognizing whether or not path is clear and signaling or marking obstacles 5S is a lean concept that provides a framework for keeping work areas efficient through cleaning and organizing. Measuring the effectiveness of 5S in a workplace can be subjective and difficult. The cart's vision system can provide an objective measure of cleanliness by measuring the number of times it has to re-plan to go around objects which are not normally kept in pathways, for example.

The cart's load cells can be used to check the accuracy of the payload before leaving/arriving. This promotes quality checks/assurance and prevents loss. The load cells may also detect unexpected shifts in payload while en route and cause the cart to stop moving, change speed, or change direction. And the load cells may detect 'riders' or other unexpected changes in payload and cause the cart to stop moving, change speed, or change direction.

Warehouse Applications

Typical use cases include, but are not limited to:

Movement of inventory from reserve storage to the main picking area for restocking/picking.

Movement between picking areas, where persons remain stationed in particular areas and the carts travel between zones to pick up or drop off goods.

Movement between pick areas, where the cart follows a person as they move through a pick area.

Movement between picking areas, where a person is guided to the next pick area by the cart.

Movement of picked goods to an area for packing.

Movement of packages from a packaging area to a loading bay (and sometimes 'into') trucks.

Movement of goods to an area for machine offload (e.g. via a robotic arm, movable 'piston' that can push goods off the cart, etc.)

Other, less conventional uses include, but are not limited to:

Night security (cart updates map periodically and shows changes in map)

Operate inside and outside (drive over rough ground; the cart's passive sensors are immune to sunlight)

Movement of goods to an area for cart-initiated offload (e.g. by actuating an onboard arm/actuator/conveyor, by triggering an offboard arm/actuator/conveyor, and/or moving into a static barrier that can capture and/or push objects from the vehicle.)

Double-check accuracy of payload before leaving/arriving via onboard load (mass) sensors. (quality checks/assurance, loss prevention)

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the technology disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An autonomous cart comprising:
a chassis;
a plurality of wheels, mechanically coupled to the chassis, to enable movement of the chassis along a surface;
a motor, mechanically coupled to at least one wheel in the plurality of wheels, to rotate the at least one wheel and to turn the at least one wheel to slow and/or stop the autonomous cart;
a load cell, mechanically coupled to the chassis, to sense force exerted on the chassis and to generate a signal representing a magnitude and direction of the force; and
a processor, operably coupled to the load cell, to actuate the motor in response to the signal generated by the load cell;
wherein the autonomous cart is configured to navigate through an environment at a low cost by:
determining a first path of motion to navigate through the environment;
determining a total cost of the first path of motion using a costmap associated with the environment;
determining a second path of motion to navigate through the environment;
determining a total cost of the second path of motion using the costmap;
determining that the total cost of the second path of motion is the low cost; and
selecting the second path of motion.

2. A method, comprising:
receiving, by a first autonomous cart, a map of an environment from a server, the map comprising a costmap that represents a cost to the first autonomous cart for moving through a certain portion of the environment;
determining a swept volume for the first autonomous cart, wherein the swept volume represents a sum of footprints that the first autonomous cart will occupy after navigating through the environment;
navigating, by the first autonomous cart, through the environment based on the costmap at a low cost, wherein the cost is determined using the costmap;
detecting, by the first autonomous cart, a change in the environment with respect to the map while navigating through the environment, the change being at least one of an alteration in visual appearance of the environment with respect to the map or a discovery of a new portion of the environment not represented in the map; and
transmitting, by the first autonomous cart, a representation of the change to the server.

3. The method of claim 2, further comprising:
receiving, by the first autonomous cart, an updated map of the environment from the server, the updated map showing the change detected by the first autonomous cart.

4. The method of claim 2, wherein the costmap further represents at least one of a passable area or an impassable area for the first autonomous cart in the environment.

5. The method of claim 4, wherein navigating through the environment includes:
generating a two-dimensional (2D) traversability map based on the costmap, the 2D traversability map including traversability information for the first autonomous cart.

6. The method of claim 5, further comprising:
identifying a plurality of destinations for the first autonomous cart based on the 2D traversability map;
evaluating a set of maneuvers for the first autonomous cart to arrive at each of the plurality of destinations;
calculating a feasible path based on the evaluation of the set of maneuvers;
generating a planned path based at least in part on the feasible path; and
obtaining a smoothed trajectory for the first autonomous cart based on the planned path.

7. The method of claim 6, further comprising:
determining whether the smoothed trajectory violates a constraint in the traversability map;
in response to determining that the smoothed trajectory violates the constraint, rejecting the smoothed trajectory and subsequent trajectories within the planned path; and
in response to determining that the smoothed trajectory does not violate the constraint, executing the smoothed trajectory and subsequent trajectories on the planned path.

8. The method of claim 2, further comprising:
determining a first path of motion to navigate through the environment, the first path of motion comprising a first motion and a second motion;
determining a cost of the first motion using the costmap;
determining a cost of the second motion using the costmap; and
determining a total cost of the first path of motion.

9. The method of claim 8, further comprising:
determining a total cost of a second path of motion;
determining that the total cost of the second path of motion is the low cost; and
selecting the second path of motion.

10. The method of claim 2, further comprising:
determining a cost for the movement through the environment for the navigation using the costmap and the swept volume.

11. The method of claim 2, wherein detecting the change comprises detecting the change using one or more cameras.

12. A method, comprising:
transmitting, by a server, a map of an environment to a first autonomous cart, the map comprising a costmap that represents a cost to the first autonomous cart for moving through a certain portion of the environment, wherein the first autonomous cart uses the costmap to navigate through the environment at a low cost, and wherein the first autonomous cart is configured to determine a swept volume that represents a sum of footprints that the first autonomous cart will occupy after navigating through the environment;
receiving, by the server, a representation of a change in the environment detected by the first autonomous cart, the change being indicative of at least one of an alteration in visual appearance of the environment with respect to the map and a discovery of a new portion of the environment not represented in the map;
generating, by the server, an updated map of the environment, the updated map showing the change detected by the first autonomous cart; and transmitting, by the server, the updated map to at least one of the first autonomous cart or a second autonomous cart.

13. A system, comprising:
a server; and
a first autonomous cart, the first autonomous cart communicatively coupled to the server, the first autonomous cart configured to:
   obtain a map of an environment from the server, the map comprising a costmap that represents a cost to the first autonomous cart for moving through a certain portion of the environment;
   determine a swept volume for the first autonomous cart, wherein the swept volume represents a sum of footprints that the first autonomous cart will occupy after navigating through the environment;
   navigate through the environment based on the costmap at a low cost, wherein the cost is determined using the costmap;
   detect a change in the environment with respect to the map while navigating through the environment, the change being at least one of an alteration in visual appearance of the environment with respect to the map or a discovery of a new portion of the environment not represented in the map; and
   transmit a representation of the change to the sever.

14. The system of claim 13, wherein the first autonomous cart is further configured to:
   obtain an updated map of the environment from the server, the updated map showing the change detected by the first autonomous cart.

15. The system of claim 13, wherein the costmap further represents at least one of a passable area or an impassable area for the first autonomous cart in the environment.

16. The system of claim 15, wherein the first autonomous cart is further configured to:
   generate a two-dimensional (2D) traversability map based on the costmap, the 2D traversability map including traversability information for the first autonomous cart.

17. The system of claim 16, wherein the first autonomous cart is further configured to:
   identify a plurality of destinations based on the 2D traversability map;
   evaluate a set of maneuvers to arrive at each of the plurality of destinations;
   calculate a feasible path based on the evaluation of the set of maneuvers;
   generate a planned path based at least in part on the feasible path;
   obtain a smoothed trajectory based on the planned path.

18. The system of claim 17, wherein the first autonomous cart is further configured to:
   determine whether the smoothed trajectory violates a constraint in the traversability map;
   in response to determining that the smoothed trajectory violates the constraint, rejecting the smoothed trajectory and subsequent trajectories within the planned path; and
   in response to determining that the smoothed trajectory does not violate the constraint, executing the smoothed trajectory and subsequent trajectories on the planned path.

19. A system, comprising:
a first autonomous cart;
a second autonomous cart, the second autonomous cart communicatively coupled to the first autonomous cart; and
a server, the server communicatively coupled to the first autonomous cart and the second autonomous cart, the server configured to:
   transmit a map of an environment to the first autonomous cart, the map comprising a costmap that represents a cost to the first autonomous cart for moving through a certain portion of the environment, wherein the first autonomous cart uses the costmap to navigate through the environment at a low cost, and wherein the first autonomous cart is configured to determine a swept volume that represents a sum of footprints that the first autonomous cart will occupy after navigating through the environment;
   obtain a representation of a change in the environment detected by the first autonomous cart, the change being indicative of at least one an alteration in visual appearance of the environment with respect to the map and a discovery of a new portion of the environment not represented in the map;
   generate an updated map of the environment, the updated map showing the change detected by the first autonomous cart; and
   transmit the updated map to at least one of the first autonomous cart or the second autonomous cart.

* * * * *